US006973571B2

(12) United States Patent
Lee et al.

(10) Patent No.: US 6,973,571 B2
(45) Date of Patent: Dec. 6, 2005

(54) SYSTEM, APPARATUS, AND METHOD FOR PERFORMING CRYPTOGRAPHIC VALIDITY SERVICES

(75) Inventors: Elizabeth L. Lee, Lafayette, CA (US); Phillip R. Schlesinger, San Francisco, CA (US)

(73) Assignee: Bank of America Corporation, Charlotte, NC (US)

(*) Notice: Subject to any disclaimer, the term of this patent is extended or adjusted under 35 U.S.C. 154(b) by 877 days.

(21) Appl. No.: 09/897,450

(22) Filed: Jul. 3, 2001

(65) Prior Publication Data

US 2003/0009665 A1    Jan. 9, 2003

(51) Int. Cl.⁷ ................................ H04L 9/00
(52) U.S. Cl. ................ 713/168; 713/169; 713/170; 705/67; 705/70
(58) Field of Search ................... 713/168, 169, 713/170, 175, 176, 155, 156, 181

(56) References Cited

U.S. PATENT DOCUMENTS

| | | | |
|---|---|---|---|
| 4,879,747 A | 11/1989 | Leighton et al. | |
| 4,995,081 A | 2/1991 | Leighton et al. | |
| 5,016,274 A | 5/1991 | Micali et al. | |
| 5,276,737 A | 1/1994 | Micali | |
| 5,315,658 A | 5/1994 | Micali | |
| 5,351,302 A | 9/1994 | Leighton et al. | |
| 5,420,927 A | 5/1995 | Micali | |
| 5,499,296 A | 3/1996 | Micali | |
| 5,519,778 A | 5/1996 | Leighton et al. | |
| 5,537,475 A | 7/1996 | Micali | |
| 5,610,982 A | 3/1997 | Micali | |
| 5,615,269 A | 3/1997 | Micali | |
| 5,629,982 A | 5/1997 | Micali | |
| 5,638,447 A | 6/1997 | Micali | |
| 5,666,414 A | 9/1997 | Micali | |
| 5,666,416 A | 9/1997 | Micali | |
| 5,666,420 A | 9/1997 | Micali | |
| 5,677,952 A * | 10/1997 | Blakley et al. | ............. 713/189 |
| 5,717,759 A | 2/1998 | Micali | |
| RE35,808 E | 5/1998 | Micali | |
| 5,747,759 A | 5/1998 | Lochmahr et al. | |
| 5,790,665 A | 8/1998 | Micali | |
| 5,793,868 A | 8/1998 | Micali | |
| 5,812,670 A | 9/1998 | Micali | |
| 5,963,649 A | 10/1999 | Sako | |
| 6,028,933 A * | 2/2000 | Heer et al. | ................... 713/169 |
| 6,065,120 A * | 5/2000 | Laursen et al. | ............. 713/201 |

(Continued)

OTHER PUBLICATIONS

Kline, Charles S., et al. "Digital Signatures: Principles and Implementations," Journal of Telecommunication Networks, pp. 61-81.

Primary Examiner—Kambiz Zand
(74) Attorney, Agent, or Firm—Michael A. Springs; Moore & Van Allen PLLC; Steven B. Phillips

(57) ABSTRACT

Embodiments of the present invention described and shown in the specification and drawings facilitate electronic authentication services for banking and other industries. Authentication services, often using Public Key Infrastructure (PKI) technology, are used to confirm the identity of the sender of data and to ensure that the data that was received is identical to the data that was sent. Embodiments of the present invention provide authentication services that may be used by a variety of configurations of entities requesting data authentication and entities responding to those requests. Embodiments of the present invention also support compatibility with commercial data authentication standards, integration with third-party data authentication software such as Secude (for Identrus access), and systems to control data authentication risks.

54 Claims, 13 Drawing Sheets

U.S. PATENT DOCUMENTS

| | | |
|---|---|---|
| 6,158,003 A | 12/2000 | Kara |
| 6,173,400 B1 | 1/2001 | Perlman et al. |
| 6,185,684 B1 | 2/2001 | Pravetz et al. |
| 6,618,789 B1 * | 9/2003 | Okaue et al. ............... 711/103 |
| 6,636,892 B1 * | 10/2003 | Philyaw ..................... 709/217 |
| 6,654,831 B1 * | 11/2003 | Otterness et al. ............ 710/74 |
| 6,754,214 B1 * | 6/2004 | Mahalingaiah .............. 370/392 |
| 6,826,711 B2 * | 11/2004 | Moulton et al. ............... 714/6 |

\* cited by examiner

Two-Corner Trust Model

Three-Corner Trust Model

Four-Corner Trust Model

SYSTEM, APPARATUS, AND METHOD FOR PERFORMING CRYPTOGRAPHIC VALIDITY SERVICES

BACKGROUND OF THE INVENTION

This invention relates to electronic transaction applications, and more particularly to systems, methods, and apparatuses that use Public Key Infrastructure (PKI) techniques to authenticate electronic signatures.

DESCRIPTION OF THE RELEVANT ART

The business of electronic authentication services has generally been structured by a Trust Model. The Trust Model typically involves participants with four Trust Roles. These roles are Subscribing Customer, Relying Customer, Relying Participant, and Issuing Participant.

The Subscribing Customer is an entity that uses digital certificates to create electronic signatures. As is known in the art, a digital certificate is used with data to be signed to produce a PKI standard encrypted hash referred to as the message digest. The message digest together with the digital certificate forms the electronic signature of the data.

The Relying Customer is an entity that desires to determine whether a digital certificate in question was used to sign a specific item of data and if the digital certificate itself is valid. The activity of determining whether a digital certificate was used to sign a specific item of data and if the digital certificate itself is valid is referred to herein as "cryptographic validity services" or "authentication."

The Relying Participant is an entity that responds to certificate status inquiries from Relying Customers.

The Issuing Participant is an entity that creates digital certificates and provides them to Subscribing Customers.

Several Trust Models exist. Typically, in the Two-Corner Trust Model, as depicted in FIG. 1, Issuing Participant 104, Relying Customer 102, and Relying Participant 103 are all the same entity. Subscribing Customer 101 presents an electronic signature to Relying Customer 102/Relying Participant 103/Issuing Participant 104. Relying Customer 102/Relying Participant 103/Issuing Participant 104 checks the certificate status and informs Subscribing Customer 101 as to whether the signature is acceptable.

Typically, in the Three-Corner Trust Model, as depicted in FIG. 2, Relying Participant 103 and Issuing Participant 104 are the same entity. Subscribing Customer 101 presents an electronic signature to Relying Customer 102. Relying Customer 102 then submits a certificate status query to Relying Participant 103/Issuing Participant 104. Relying Participant 103/Issuing Participant 104 checks the certificate status and informs Relying Customer 102 as to whether the certificate is valid. Relying Customer 102 then informs Subscribing Customer 101 as to whether the electronic signature is acceptable.

Typically, in the Four-Corner Trust Model, as depicted in FIG. 3, Subscribing Customer 101 presents an electronic signature to Relying Customer 102. Relying Customer 102 then submits a certificate status query to Relying Participant 103. In this case a separate fourth party, Issuing Participant 104, has issued the digital certificate used to create the electronic signature. Relying Participant 103 locates Issuing Participant 104 for the digital certificate and asks Issuing Participant 104 to check the certificate status. Issuing Participant 104 provides the certificate status information to Relying Participant 103. Relying Participant 103 then informs Relying Customer 102 as to whether the certificate is valid. Finally, Relying Customer 102 informs Subscribing Customer 101 as to whether the electronic signature is acceptable.

Note that references in this specification to a particular Trust Model entity may refer, as appropriate, to that particular Trust Model entity in combination with another Trust Model entity, or to that particular Trust Model entity not in combination with another Trust Model entity. For example, references to the Issuing Participant that issued a particular digital certificate will refer to a Relying Participant/Issuing Participant combination entity when that combination entity issued the particular digital certificate, even if it also serves additional functions (as in the Three-Cornered Trust Model), or will refer to an Issuing Participant entity when that uncombined entity issued the particular digital certificate (as in the Four-Cornered Trust Model).

SUMMARY OF THE INVENTION

Embodiments of the present invention described and shown in the specification, claims, and drawing facilitate the provision of cryptographic validity services for banking and other industries. Some embodiments of the present invention provide authentication services through an application programming interface to a Relying Customer Service Engine that is coupled to a Relying Participant Service Engine. Embodiments of the present invention also provide configurable risk-control, compatibility with commercial Identrus standards (Identrus is controlled by Identrus LLC, 140 East 45th Street, 16th Floor, New York, N.Y. 10017), and integration with third-party software such as Secude (manufactured by SECUDE Sicherhreitstechnologie, Informationssysteme Gmbh, DovivostraBell, 0-64293, Darnstade, Germany) for Identrus access.

An object of the present invention is to facilitate the provision of electronic authentication services.

In some embodiments of the present invention, a Validation Services Platform performs authentication on an Electronic Signature contained in a Validation Request by receiving the Validation Request from a Relying Customer Interface, formulating a Query responsive to the Validation Request, transmitting the Query to a Relying Participant Interface, receiving a Query Response from the Relying Participant Interface, formulating a Validation Response responsive to the Query Response, and transmitting the Validation Response to the Relying Customer Interface. The Relying Customer Interface may be in communication with a Relying Customer, and the Relying, Participant Interface may be in communication with a Relying Participant.

Additional objects and advantages of the invention are set forth in part in the description which follows, and in part are obvious from the description, or may be learned by practice of the invention. The objects and advantages of the invention may also be realized and attained by means of the methods, instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

In the accompanying drawing.

DETAILED DESCRIPTION

Interpretation of Terms

Figure 1:
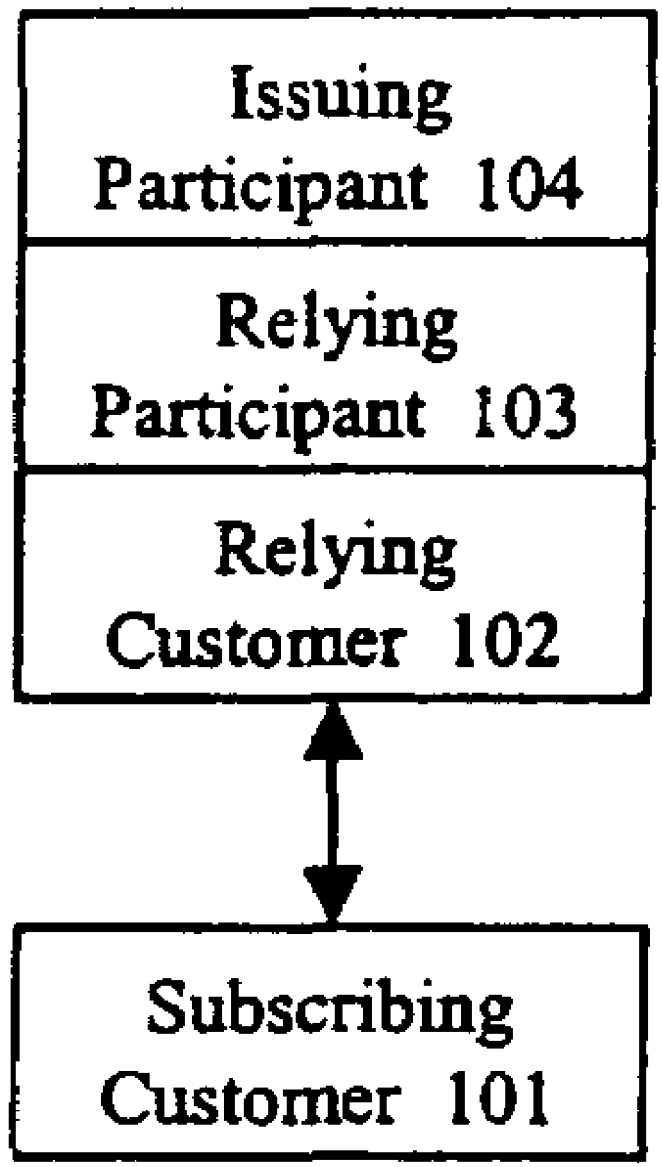
FIG. 1 is a diagram depicting the Two-Corner Trust Model for the authentication of electronic signatures.
Figure 2:
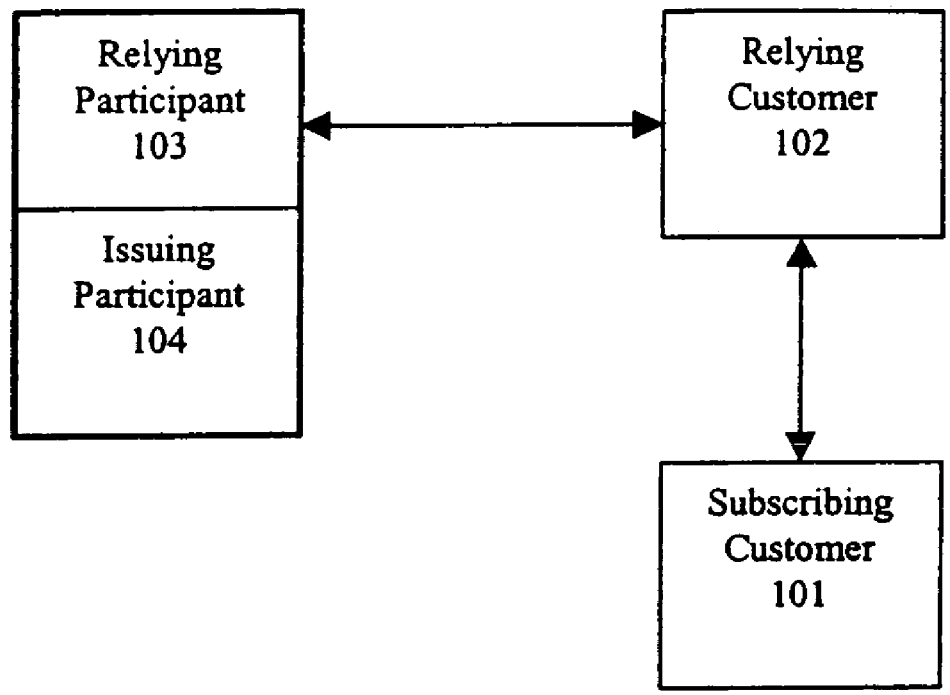
FIG. 2 is a diagram depicting the Three-Corner Trust Model for the authentication of electronic signatures.
Figure 3:
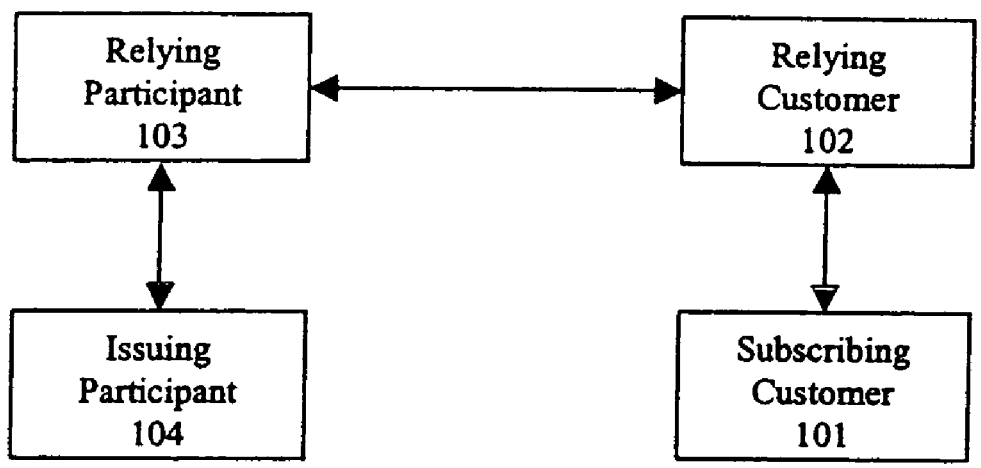
FIG. 3 is a diagram depicting the Four-Corner Trust Model for the authentication of electronic signatures.

Unless otherwise noted in this specification or in the claims, all of the terms used in the specification and the claims will have the meanings normally ascribed to these terms by workers in the art. Certain terms specifically comprise the meanings associated with them as follows:

1. Storage Device: A physical or virtual element for storing programs or data for manipulation by computer systems. Physical Storage Devices comprise memory modules, random access memory chips (RAM), various programmable memory chips, fixed and removable disk drives, and other computer storage devices as are known in the art. Virtual Storage Devices comprise virtual memory pages, virtual disks and other physical Storage Devices that are simulated by software, and other virtual storage elements as are know in the art.

2. Processor: A physical or virtual element whose operation is controlled by one or more computer programs. Processors comprise general purpose computer systems, special purpose computer systems, distributed computer systems, processor chips, discrete electronic circuits, processors that are simulated by software, and other computer processing devices as are known in the art.

3. Distributed Storage Array: One or more Storage Devices that are logically or physically coupled, or both. For example, a single Storage Device is a Distributed Storage Array. Another example of a Distributed Storage Array is a plurality of Storage Devices that are in physically different locations but are logically or physically coupled, or both.

4. Distributed Processor Array: One or more Processors that are logically or physically coupled, or both. For example, a single Processor is a Distributed Processor Array. Another example of a Distributed Processor Array is a plurality of Processors that are in physically different locations but are logically or physically coupled, or both.

5. Program: Instructions or data, or both, stored in a Distributed Storage Array, for controlling a Distributed Processor Array. For example, a Program may reside on a Distributed Storage Array consisting of a single Storage Device and may control a Distributed Processor Array consisting of a single Processor, where both the Storage Device and the Processor are components of a personal computer. In another example, a Program may reside on a Distributed Storage Array consisting of a plurality of geographically separated Storage Elements and may control a Distributed Processor Array consisting of a plurality of geographically separated Processors. In this example, the Storage Elements and Processors may be grouped to form a plurality of computer systems that are coupled through computer communications networks such as the Internet.

6. Configuration Data. In embodiments of the present invention, Configuration Data comprises information for configuring the operation of the invention. Configuration Data may be provided to an entity of the present invention through an external source, for example using the System API described below or as an external data file, or Configuration Data may be built into the entity, for example as a configuration module as is know in the art. As used in this specification, the term "entity" refers to any object that may be placed in communication with any other object, and comprises, for example, persons, organizations, logical structures, physical structures, computer systems, and program modules. In some embodiments where the present invention comprises one or more entities in communication with other entities (within or outside the systems of the present invention), via computer communications networks such as the Internet, the Configuration Data may comprise, for example and as is known in the art:

a. HOST names for each entity that will be placed in communication with an entity of the present invention.

b. PORT numbers corresponding to each HOST.

c. Security protocol information, as is known in the art, as required to make a secure encrypted connection to each HOST.

d. Identification information necessary to identify each entity of the present invention to those entities with which it will be placed in communication. For example and as is known in the art, such identification information may comprise appropriate SSL Digital Certificates.

e. Identification information necessary to authenticate, to entities of the present invention, those entities with which entities of the present invention will be in communication. For example and as is known in the art, such identification information may comprise appropriate identifying SSL Digital Certificates.

Figure 6:
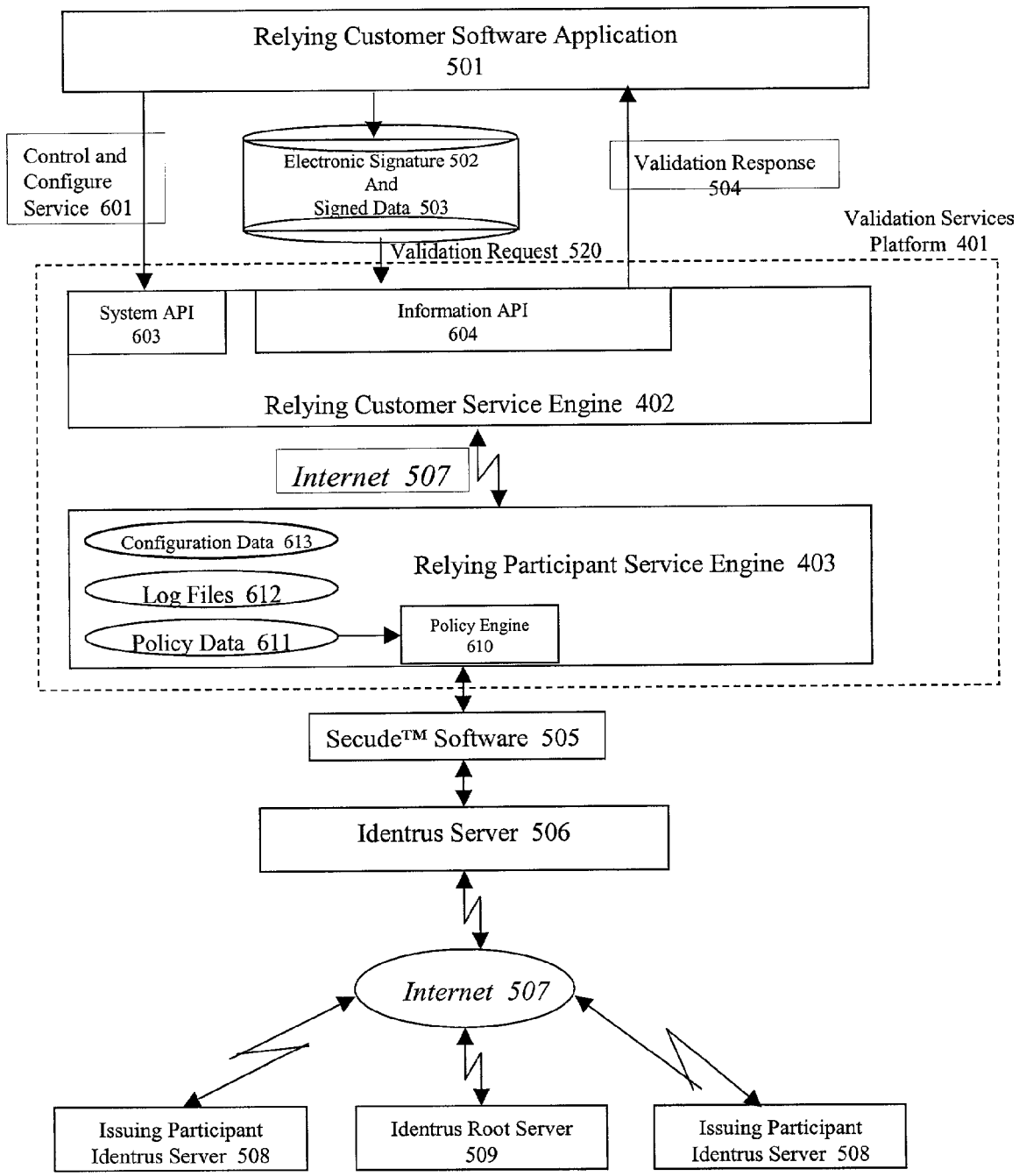
FIG. 6 is a more detailed diagram depicting the Validation Services Platform embodiment depicted in FIGS. 4 and 5.

To continue this example, and for some embodiments of the present invention, as depicted in FIG. 6, the present invention comprises Validation Services Platform 401. Validation Services Platform 401 comprises two entities, Relying Customer Service Engine 402 and Relying Participant Service Engine 403. These two entities are in communication via a computer communications network, e.g., the Internet, as denoted by Internet 507, and Configuration Data as just described are used to establish a communications channel between the two entities. As depicted, Relying Participant Service Engine 403 internally contains Configuration Data, denoted as Configuration Data 613. In some embodiments, Relying Customer Service Engine 402 obtains Configuration Data from Relying Customer Software Application 501 via a communications path denoted as Control and Configure Service 601.

Figure 5:
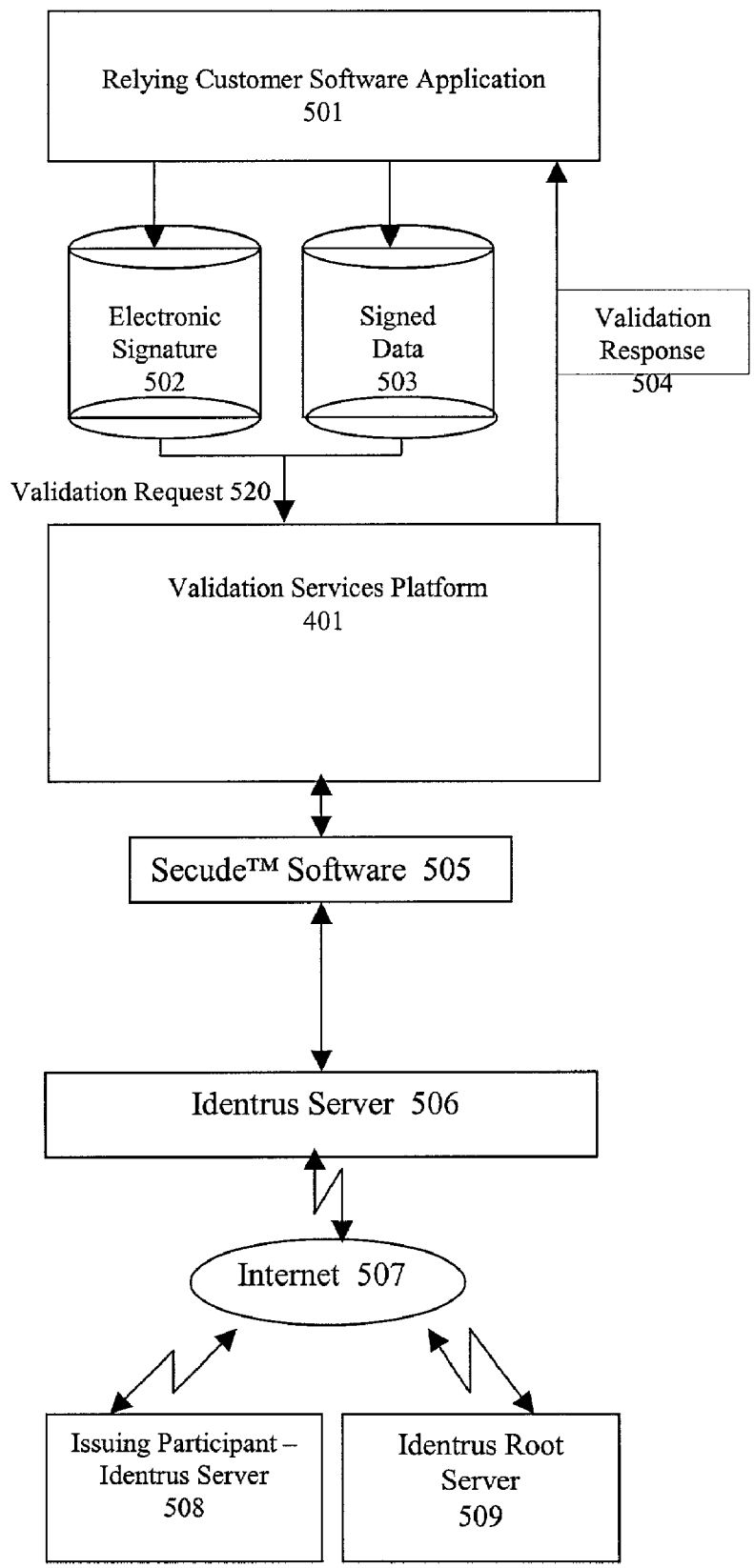
FIG. 5 is a more detailed diagram depicting some of the entities that may communicate with the Validation Services Platform embodiment depicted in FIG. 4.

7. Validation Request. In embodiments of the present invention, a Validation Request comprises an Electronic Signature and may further comprise, as described below, a copy of the data alleged to have been signed by the Electronic Signature. As is known in the art, each Electronic Signature comprises a Digital Certificate and a Message Digest. As is also known in the art, the Digital Certificate comprises a hierarchical Certificate Chain that further comprises the actual certificate allegedly used to sign the data (the Signing Certificate), and the Message Digest comprises a PKI standard encrypted hash of the data signed by the Electronic Signature. For example, as depicted in FIG. 5, Validation Request 520 comprises Electronic Signature 502 and Signed Data 503 (representing a copy of the data alleged to have been signed by Electronic Signature 502).

8. Validation Response. In embodiments of the present invention, a Validation Response comprises a determination if the data alleged to have been signed by a particular Electronic Signature had, in fact, been validly signed by that Electronic Signature. For example, as depicted in FIG. 5, Validation Response 504 comprises a determination if Signed Data 503 had, in fact, been validly signed by Electronic Signature 502. In another example, in an embodiment of the present invention, the Validation Response comprises:

a. The SERVICE STATUS of the Validation Request, comprising:
    i. SUCCESSFUL if the Validation Request was processed and the Digital Certificate in the Electronic Signature was checked via an appropriate Issuing Participant.
    ii. ERROR if there was an error in the Validation Request format and/or in the Signed Data, or if the contents of the Electronic Signature were unrecognizable.
    iii. UNAVAILABLE if the Relying Participant Service Engine did not make successful contact with the appropriate Relying Participant or Relying Participant/Issuing Participant combination, or other technical failure occurred.
    iv. CACHED if the Verification Request was processed, but the appropriate Issuing Participant was not contacted to validate the Digital Certificate in the Electronic Signature, and the Digital Certificate was checked using a previously recorded and cached response.
  b. The SERVICE NAME of the Relying Participant (for example, BANKOFAMERICA AUTHENTICATION SERVICES) providing the validation.
  c. The SERVICE VERSION of the Relying Participant Service Engine, comprising an identification of the version of software implementing the Relying Participant Service Engine.
  d. The SIGNATURE VALIDITY determination, having the values VALID and INVALID, as provided by the present invention and indicating whether the Electronic Signature is valid for the Signed Data in the associated Verification Request.
  e. SIGNATURE DATA MATCH indicating whether the Electronic Signature actually matched the Signed Data.
  f. The SIGNING CERTIFICATE STATUS of the Digital Certificate used to create the Electronic Signature, for example, VALID, EXPIRED, REVOKED, etc.
  g. The ISSUING AUTHORITY CERTIFICATE STATUS of the Digital Certificate of the Authority which issued the Signing Digital Certificate.
  h. The SIGNING CERTIFICATE CONTENTS, providing the information contained in the signing Certificate allegedly used to sign the Signed Data which, in some embodiments, comprises:
    i. THE PKI Distinguished Name of this Digital Certificate.
    ii. THE PKI Distinguished Name of the authority which issued this Digital Certificate.
    iii. The PKI Common Name of this Digial Certificate.
    iv. The beginning and ending validity dates of this Digital Certificate.
    v. The Serial Number of this Digital Certificate.

9. Query. One or more requests (which may be referred to as Certificate Status Requests) to a Digital Certificate verification facility to verify each of the certificates that was contained in the Certificate Chain of a Validation Request (see the Validation Request definition, above). In an embodiment of the present invention, third-party Secude Software in combination with Identrus Issuing Participant services (Identrus Services are controlled by Identrus LLC, 140 East 45th Street, 16th Floor, New York, N.Y. 10017) form the Digital Certificate verification facility. Other Digital Certificate verification facilities, for example, VeriSign, Inc., 1600 Bridge Parkway, Redwood Shores, Calif. 94065, may be used as is known in the art.

10. Query Response. The response or responses to one or more Certificate Status Requests from a Digital Certificate verification facility.

11. Relying Customer Interface. In some embodiments of the present invention, a Relying Customer Interface is the portion of the present invention that communicates with a Relying Customer. For example, in some embodiments as depicted in FIG. 6, the present invention comprises Validation Services Platform 401. Communications between the Relying Customer, partially depicted in FIG. 6 by Relying Customer Software Application 501, and Validation Services Platform 401, comprise Control and Configure Service 601, Validation Request 520, and Validation Response 504. These communications enter and exit Validation Services Platform 401 through a Relying Customer Interface, which, in some embodiments, comprises System API 603 and Information API 604. As is known in the art, the Relying Customer Interface may be implemented in hardware, in software, or as a combination of hardware and software.

12. Relying Participant Interface. In some embodiments of the present invention, a Relying Participant Interface is the portion of the present invention that communicates with a Relying Participant or with a Relying Participant/Issuing Participant combination. For example, in some embodiments depicted in FIG. 6, the present invention comprises Validation Services Platform 401. Communications between Validation Services Platform 401 and the Relying Participant/Issuing Participant combination, partially depicted in FIG. 6 by Secude Software 505, Identrus Server 506, Issuing Participant Indentrus Servers 508, and Identrus Root Server 509, are represented by the arrow between Relying Participant Service Engine 403 and Secude Software 505. These communications enter and exit Validation Services Platform 401 through a Relying Participant Interface. As is known in the art, the Relying Participant Interface may be implemented in hardware, in software, or as a combination of hardware and software.

13. System API. In some embodiments of the present invention, a System Application Programming Interface (API) provides a predefined set of functions for initializing and terminating the operation of the Relying Customer Service Engine of the present invention, and for recording status information for financial audits, billing, and maintenance. As is known in the art, an API is said to be "exposed" when entities external to the entity containing the API are able to make use of the API. For example, in some embodiments depicted in FIG. 6, System API 603 is contained in the Relying Customer Service Engine 402 portion of Validation Services Platform 401. Validation Services Platform 401 exposes System API 603 to Relying Customer Software Application 501. Relying Customer Software Application 501 uses, as is known in the art, System API 603 to control and configure Relying Customer Service Engine 402 via the Control and Configure Service 601 path.

14. Information API. In some embodiments of the present invention, the Information API provides a predefined set of functions for sending a Validation Request to systems or apparatus of the invention and for obtaining a Validation Response from systems or apparatus of the invention. For example, in some embodiments depicted in FIG. 6, Information API 604 is contained in the Relying Customer Service Engine 402 portion of Validation Services Platform 401. Valdation Services Platform 401 exposes Information API 604 to Relying Customer Software Application 501. Relying Customer Software Application 501 uses, as is known in the art, Information API 604 to transmit Validation Request 520 to Validation Services Platform 401, and to receive Validation Response 504 from Validation Services Platform 401.

15. Policy Engine. In some embodiments of the present invention, the Policy Engine determines if the Electronic Signature contained in a Validation Request is valid or invalid, based, for example, on examination of the Electronic Signature, a Query Response related to the Electronic Signature, and business policies provided by the Relying Participant. For example, in some embodiments depicted in FIG. 10, Policy Engine 610 is contained in Relying Participant Service Engine 403. Business policies related to the acceptance of Electronic Signatures are provided to Policy Engine 610 as dataset Policy Data 611. Policy Engine 610 converts, as is known in the art, Policy Data 611 to Policy tables 1005 which are internal to Policy Engine 610. In some embodiments, this conversion occurs when Policy Engine 610 is initialized as part of the initialization of systems, apparatuses or methods of the present invention. In other embodiments, business policies of the Relying Participant are separately converted into Policy Tables 1005, for example by a computer programmer, and are built into Policy Engine 610. In some embodiments, Relying Participant Service Engine 403 provides Policy Engine 610 with the results of an examination of the Electronic Signature and with the Query Response related to the Electronic Signature for use, in conjunction with the business policies, in authenticating the Electronic Signature.

16. Validation Services Platform. In some embodiments of the present invention, the Validation Services Platform performs authentication on the Electronic Signature contained in a Validation Request by receiving the Validation Request from a Relying Customer Interface, formulating a Query responsive to the Validation Request, transmitting the Query to a Relying Participant Interface, receiving a Query Response from the Relying Participant Interface, formulating a Validation Response responsive to the Query Response, and transmitting the Validation Response to the Relying Customer Interface. The Relying Customer Interface may be in communication with a Relying Customer and the Relying Participant Interface may be in communication with a Relying Participant.

Figure 4:
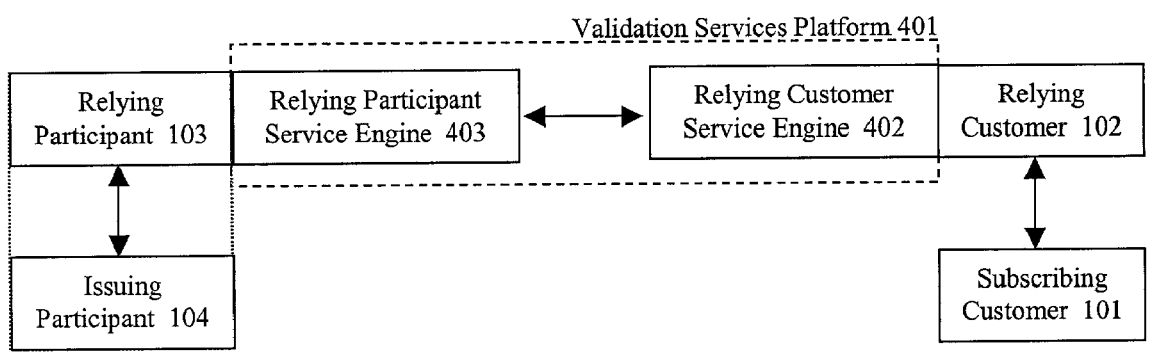
FIG. 4 is a diagram depicting an embodiment of the Validation Services Platform of the present invention.

For example, in embodiments of the present invention depicted in FIG. 4, Validation Services Platform 401 comprises a Relying Customer Interface that is in communication with Relying Customer 102, and comprises a Relying Participant Interface that is in communication with Relying Participant 103.

The Validation Services Platform may be implemented, as is known in the art, as software running on general purpose computers or special purpose computers, as hardware, or as combinations of software and hardware.

17. Relying Participant Service Engine. In some embodiments of the present invention, the Relying Participant Service Engine performs authentication on the Electronic Signature contained in a Validation Request by receiving the Validation Request, formulating a Query responsive to the Validation Request, transmitting the Query to a Relying Participant Interface, receiving a Query Response from the Relying Participant Interface, formulating a Validation Response responsive to the Query Response, and transmitting the Validation Response. In some embodiments, the Relying Participant Service Engine performs as a server, as is known in the art, with one or more clients (for example, Relying Customer Service Engines) sending Validation Requests to the Relying Participant Service Engine. In some further embodiments of the present invention, the Validation Response is responsive to a Policy Engine. For example, in some embodiments depicted in FIG. 6, Relying Participant Service Engine 403 receives Validation Request 520 from Relying Customer Service Engine 402 via an Internet-based communication channel, Internet 507. Relying Participant Service Engine 403 formulates a Query, and transmits the Query to the Relying Participant Interface that is in communication with Secude Software 505. Secude Software 505 sends a Query Response to the Relying Participant Interface. Relying Participant Service Engine 403 receives the Query Response from the Relying Participant Interface, formulates Validation Response 504 based on the Query Response and the operation of Policy Engine 610, and transmits Validation Response 504 to Relying Customer Service Engine 402 via Internet 507.

The Relying Participant Service Engine may be implemented, as is known in the art, as software running on general purpose computers or special purpose computers, as hardware, or as combinations of software and hardware.

18. Relying Customer Service Engine. In some embodiments of the present invention, the Relying Customer Service Engine coordinates communications between the Relying Customer and the Relying Participant Service Engine. In these embodiments, the Relying Customer Service Engine has a Relying Customer Interface which is in communication with a Relying Customer, and receives a Validation Request from the Relying Customer Interface and transmits the Validation Response to the Relying Customer Interface. The Relying Customer Interface may include a System API and may include an Information API. In further embodiments, a communication channel is established between the Relying Customer Service Engine and the Relying Participant Service Engine to transport the Validation Request and the Validation Response. In some embodiments, one or more Relying Customer Service Engines are clients, as is known in the art, of a single Relying Participant Service Engine that is a server.

In some embodiments, the Relying Customer Service Engine performs consistency checking on the Validation Request. Consistency checking determines, for a particular Validation Request, if the Electronic Signature actually signed the Signed Data. In some embodiments, if the Electronic Signature was found not to have signed the Signed Data, then the Relying Customer Service Engine would send, to the Relying Customer Interface, a Validation Response noting that the Electronic Signature was not valid and would not invoke the Relying Participant Service Engine. If the Electronic Signature was found to have signed the Signed Data, then the Validation Request would be sent to the Relying Participant Service Engine for validation of the Validation Request's Digital Certificates.

For example, in some embodiments depicted in FIG. 6, the Relying Customer Interface of Relying Customer Service Engine 402 comprises System API 603 and Information API 604. The Relying Customer Interface is in communication with Relying Customer Software Application 501. A Validation Request 520 is sent to Information API 604 by Relying Customer Software Application 501. Validation Request 502 is received by Relying Customer Service Engine 402 from Information API 604. Relying Customer Service Engine 402 and Relying Participant Service Engine 403 previously established an Internet based communication channel, Internet 507, between Relying Customer Service Engine 402 and Relying Participant Service Engine 403. Relying Customer Service Engine 402 transmits Validation Request 520 to Relying Participant Service Engine 403 via Internet 507, and receives Validation Response 504 from Relying Participant Service Engine 403 via Internet 507. Relying Customer Service Engine transmits Validation Response 504 to Relying Customer Software Application 501 via Information API 604.

The Relying Customer Service Engine may be implemented, as is known in the art, as software running on general purpose computers or special purpose computers, as hardware, or as combinations of software and hardware.

DETAILED DESCRIPTION

Acts performed by systems, methods, apparatus elements, and apparatus functions of the present invention may be implemented, as is known in the art, as software running on general purpose computers or special purpose computers, as hardware, or as combinations of software and hardware.

As depicted in FIG. 4, Validation Services Platform 401 is an embodiment of the present invention. In this figure, Validation Services Platform 401 is in communication with Relying Customer 102 and Relying Participant 103. Relying Participant 103 may be in communication with Issuing Participant 104 or may be a Relying Participant/Issuing Participant combination. As depicted in FIG. 4, Relying Customer 102 and Relying Participant 103 may be located in close physical proximity to portions of Validation Services Platform 401, while Validation Services Platform 401 may comprise components that are distributed over a wide geographical area and communicate via communication networks such as the Internet. In some embodiments, a portion of Relying Customer 102 is a computer program running on a computer system that also runs a portion of Validation Services Platform 401.

Typically, Subscribing Customer 101 creates an Electronic-Signature by signing certain data. Subscribing Customer 101 submits the Electronic Signature and the data to Relying Customer 102 as part of a commercial transaction. Relying Customer 102 generates a Validation Request from the Electronic Signature and data, as is known in the art, and transmits the Validation Request to Validation Services Platform 401.

In some embodiments depicted in FIG. 4, Validation Services Platform 401 has a Relying Customer Interface in communication with Relying Customer 102 and has a Relying Participant Interface in communication with Relying Participant 103. Relying Customer 102 transmits the Validation Request to the Relying Customer Interface and Validation Services Platform 401 receives the Validation Request from the Relying Customer Interface. Validation Services Platform 401 formulates a Query responsive to the Validation Request and transmits the Query to the Relying Participant Interface. Relying Participant 103 receives and processes the Query, as is known in the art, and transmits a Query Response to the Relying Participant Interface. Validation Services Platform 401 receives the Query Response from the Relying Participant Interface, formulates a Validation Response responsive to the Query Response, and transmits the Validation Response to the Relying Customer Interface. Relying Customer 102 receives the Validation Response from the Relying Customer Interface. Responsive to the Validation Response, as is known in the art, Relying Customer 102 informs Subscribing Customer 101 as to the acceptance or rejection, for example, of the commercial transaction depending upon whether the Electronic Signature contained in the Validation Response was valid.

In some embodiments depicted in FIG. 4, Validation Services Platform 401 comprises Relying Customer Service Engine 402 in communication with Relying Participant Service Engine 403. In some embodiments, Relying Customer Service Engine 402 is in close physical proximity to Relying Participant Service Engine 403. For example, Relying Customer Service Engine 402 and Relying Participant Service Engine 403 may be software modules running on the same computer system and communicating with each other as is known in the art. In other embodiments, Relying Customer Service Engine 402 and Relying Participant Service Engine 403 are physically distant. For example, Relying Customer Service Engine 402 and Relying Participant Service Engine 403 may be software modules running on different computer systems that are located in different cities, and communicating via computer communications networks such as the Internet as is known in the art. In some embodiments, Relying Customer Service Engine 402 contains the Relying Customer Interface and Relying Participant Service Engine 403 contains the Relying Participant Interface. In some embodiments, multiple Relying Customer Service Engines 402 communicate with a single Relying Participant Service Engine 403.

FIG. 5 is a more detailed depiction of some of the entities that may communicate with the Validation Services Platform 401 embodiment of the present invention that was depicted in FIG. 4. In some embodiments depicted in FIG. 5, Relying Customer Software Application 501, a portion of the Relying Customer, communicates with Validation Services Platform 401 via the Relying Customer Interface portion of Validation Services Platform 401. Relying Customer Software Application 501 transmits Validation Request 520, which is comprised of Electronic Signature 502 and Signed Data 503, to the Relying Customer Interface, and receives Validation Response 504.

In some embodiments depicted in FIG. 5, a Relying Participant/Issuing Participant combination comprises Secude Software 505, Identrus Server 506, Issuing Participant-Identrus Server 508, and Identrus Root Server 509. As depicted in FIG. 5, Identrus Server 506, Issuing Participant-Identrus Server 508, and Identrus Root Server 509 communicate via Internet 507. Secude Software 505 and the Identrus servers operate together, as is known in the art, to form a Digital Certificate verification facility. As is also known in the art, other Digital Certificate verification facilities could be substituted for the Secude Software/Identrus combination depicted in FIG. 5. In other embodiments, Validation Services Platform 401 could communicate with a plurality of Digital Certificate verification facilities of the same or of different types.

In some embodiments depicted in FIG. 5, Validation Services Platform 401 communicates with Secude Software 505 via the Relying Participant Interface portion of Validation Services Platform 401. Secude Software 505 receives a Query from the Relying Participant Interface, processes the Query in conjunction with the Identrus servers as is known in the art, formulates a Query Response, and transmits the Query Response to the Relying Participant Interface.

FIG. 6 is a more detailed diagram depicting the Validation Services Platform 401 embodiment that was depicted in FIGS. 4 and 5. In some embodiments depicted in FIG. 6, Validation Services Platform 401 comprises Relying Customer Service Engine 402 and Relying Participant Service Engine 403, as described in connection with FIG. 4. In some embodiments depicted in FIG. 6, Relying Customer Service Engine 402 comprises the Relying Customer Interface of Validation Services Platform 401. In some embodiments, the Relying Customer Interface comprises System API 603 and Information API 604. In some embodiments, Validation Services Platform 401 exposes System API 603 to Relying Customer Software Application 501. Relying Customer Software Application 501 uses, as is known in the art, System API 603 to control and configure Validation Services Platform 401 via the Control and Configure Service 601 path. In some embodiments, Validation Services Platform 401 exposes Information API 604 to Relying Customer Software Application 501. Relying Customer Software Application 501 uses, as is know in the art, Information API 604 to transmit Validation Request 520 to Validation Services Platform 401, and to receive Validation Response 504 from Validation Services Platform 401.

In some embodiments depicted in FIG. 6, Relying Participant Service Engine 403 comprises the Relying Participant Interface of Validation Services Platform 401. In some embodiments depicted in FIG. 6, Relying Participant Service Engine 403 includes Policy Engine 610. As depicted in FIG. 6, some embodiments of Relying Participant Service Engine 403 include datasets such as Configuration Data 613, for storing data relating to the configuration of Relying Participant Service Engine 403; Log Files 612, for storing data relating to the operation of Relying Participant Service Engine 403; and Policy Data 611, for storing data relating to the configuration of Policy Engine 610.

Figure 7:
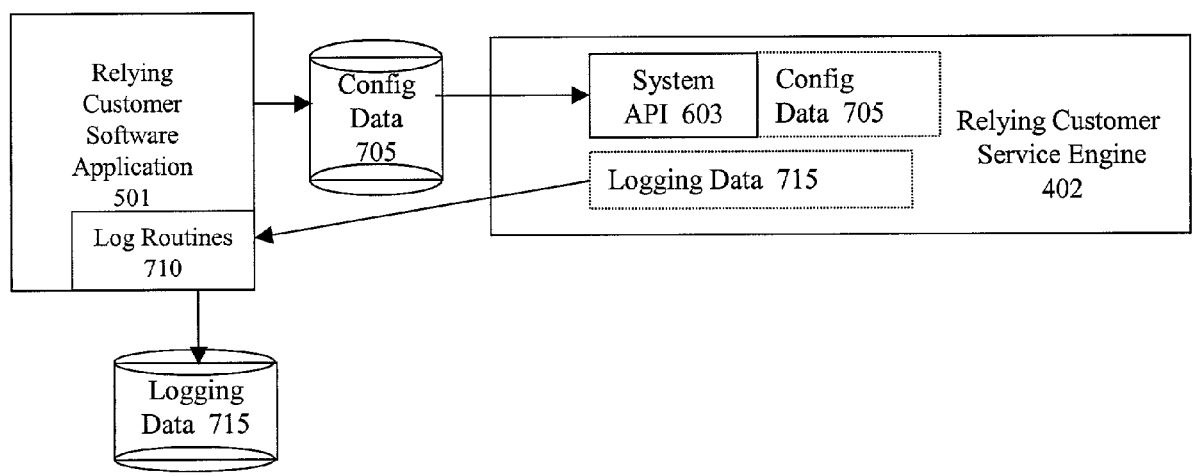
FIG. 7 is a diagram depicting the System API and Logging interface of an embodiment of the Relying Customer Service Engine of the present invention.

FIG. 7 is a diagram depicting the System API and Logging interface of some embodiments of the Relying Customer Service Engine of the present invention. In some embodiments depicted in FIG. 7, Relying Customer Software Application 501 transmits configuration data, depicted as Config Data 705, via System API 603 to Relying Customer Service Engine 402 for use in configuring Relying Customer Service Engine 402. In some embodiments depicted in FIG. 7, Config Data 705 specifies the information that is to be logged, as is known in the art, and where the logged information is to be sent. In these embodiments, the logged information, referred to as Logging Data 715, is transferred to logging programs, referred to as Log Routines 710, that are contained in Relying Customer Software Application 501. In some embodiments depicted in FIG. 7, Logging Data 715 is stored by Log Routines 710 externally from Relying Customer Service Engine 402.

Figure 8:
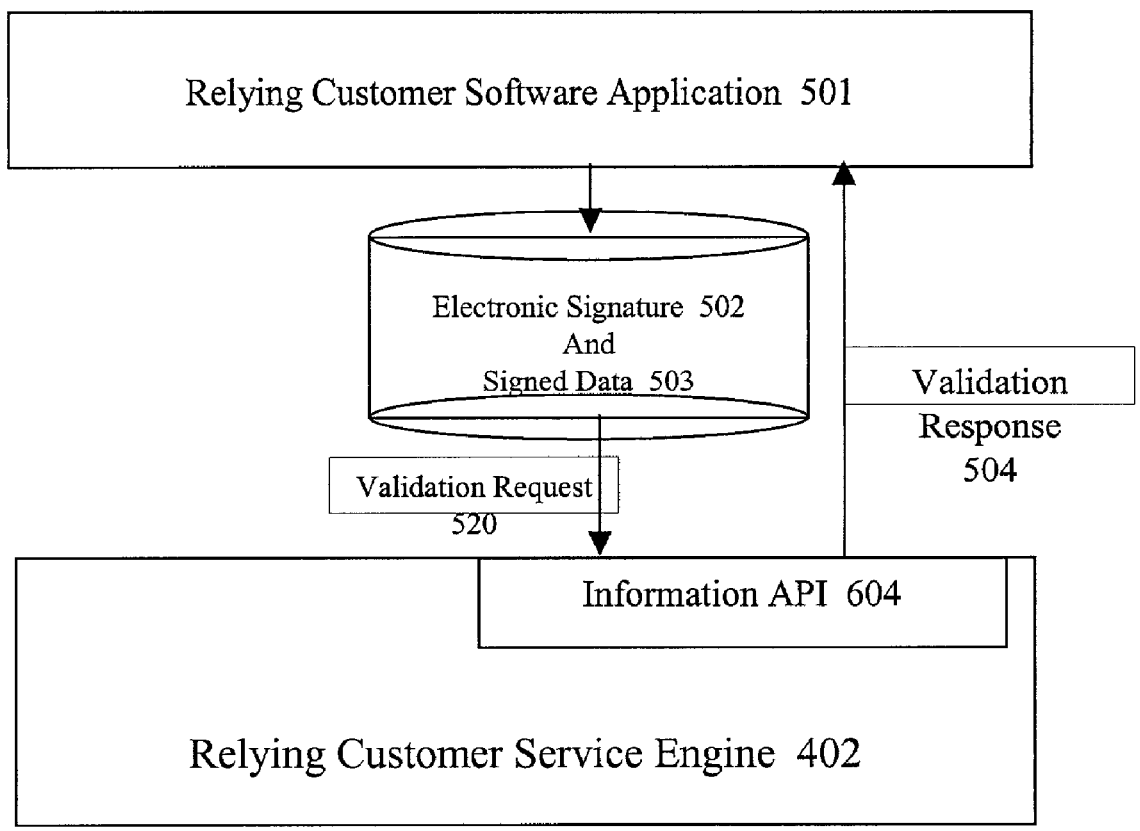
FIG. 8 is a diagram depicting the Information API of an embodiment of the Relying Customer Service Engine of the present invention.

FIG. 8 is a diagram depicting the Information API of some embodiments of the Relying Customer Service Engine of the present invention. In some embodiments depicted in FIG. 8, Relying Customer Software Application 501 transmits Validation Request 520, comprising Electronic Signature 502 and Signed Data 503, via Information API 604, for processing by Relying Customer Service Engine 402. In some embodiments depicted in FIG. 8, Relying Customer Service Engine 402 transmits Validation Response 504 to Relying Customer Software Application 501 via Information API 604.

Figure 9:
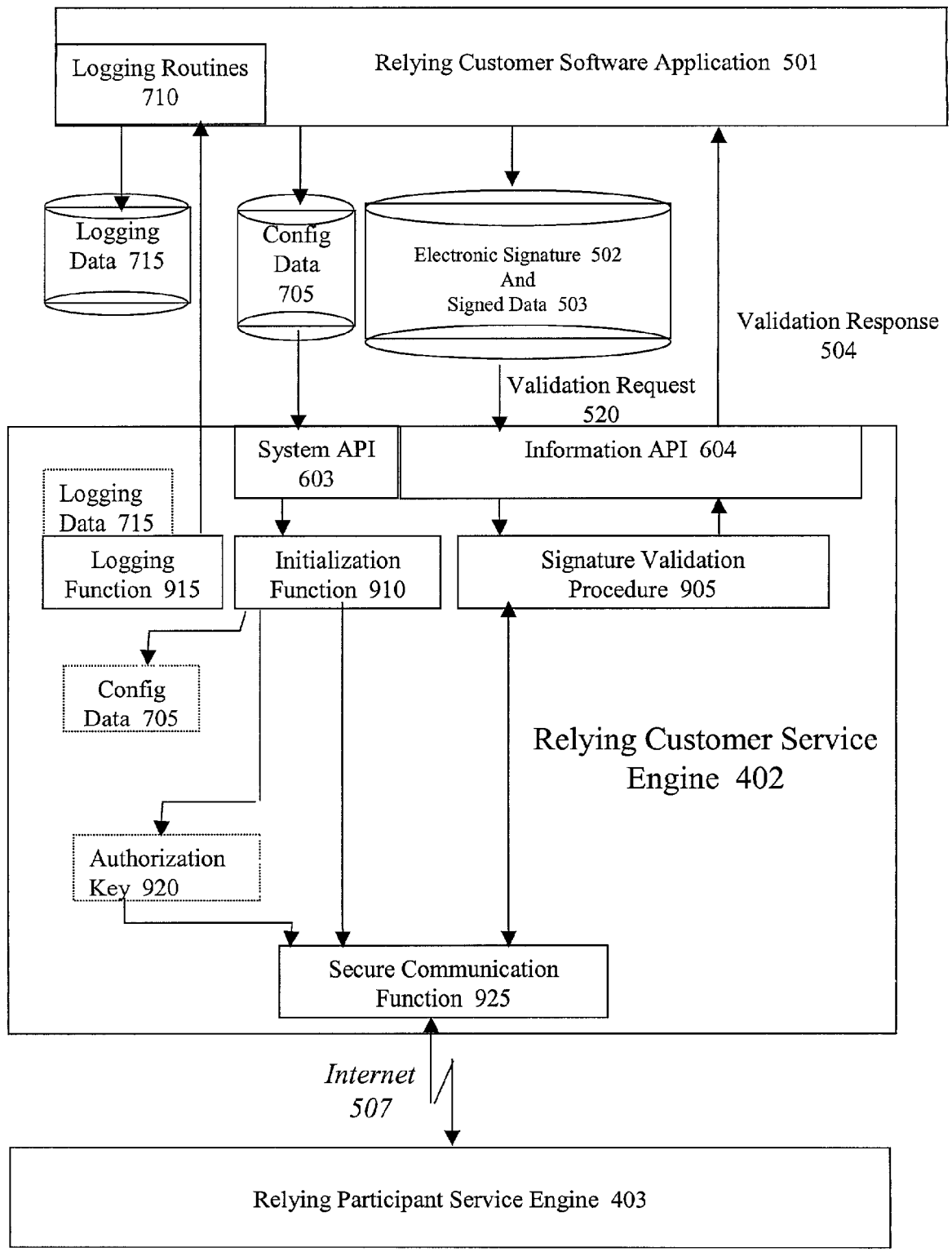
FIG. 9 is a more detailed diagram depicting an embodiment of the Relying Customer Service Engine.

FIG. 9 is a detailed diagram depicting some embodiments of the Relying Customer Service Engine of the present invention. As will be readily apparent to workers in the art, many other embodiments of the Relying Customer Service Engine may be employed and are within the scope of this invention. In some embodiments depicted in FIG. 9, at the start of operation of Relying Customer Service Engine 402, Relying Customer Software Application 501 provides Config Data 705 to Initialization Function 910 of Relying Customer Service Engine 402 via System API 603. Initialization Function 910 initializes Relying Customer Service Engine 402 using the Configuration Data provided by Config Data 705. As part of the initialization activity, Logging Function 915 is placed in communication with Logging Routines 710, Secure Communication Function 925 establishes a secure communication channel with Relying Participant Service Engine 403, and Secure Communication Function 925 obtains Authorization Key 920 from Relying Participant Service Engine 403.

Following initialization, data which is to be logged, denoted by Logging Data 715, is collected by Logging Function 915 and transferred to Logging Routines 710 for storage. When Validation Request 520 is received by Information API 604, it is sent to Signature Validation Procedure 905. In some embodiments, Signature Validation Procedure 905 performs consistency checking on Validation Request 520 and, if the consistency check determines that Electronic Signature 502 was not properly used to sign Signed Data 503, then Signature Validation Procedure 905 will send Validation Response 504 via Information API 604 to Relying Customer Software Application 501 without further processing. If the consistency check determines that Electronic Signature 502 was properly used to sign Signed Data 503, or in those embodiments where no consistency checking is done by Relying Customer Service Engine 402, then Signature Validation Procedure 905 provides Validation Request 520 to Secure Communication Function 925 for transmission to Relying Participant Service Engine 403 via Internet 507. In some embodiments where consistency checking is performed by Relying Customer Service Engine 402, Signed Data 503 is not included in Validation Request 520 when Validation Request 520 is transmitted to Relying Participant Service Engine 403. In some embodiments, Secure Communication Function 925 transmits Authorization Key 920 with Validation Request 520 to Relying Participant Service Engine 403 to demonstrate that Validation Request 520 was provided by an authorized source without, for example, requiring a new exchange of Digital Certificates between Relying Customer Service Engine 402 and Relying Participant Service Engine 403 as is known in the art.

After Relying Participant Service Engine 403 processes Validation Request 520 and produces Validation Response 504, Validation Response 504 is transmitted by Relying Participant Service Engine 403 to Secure Communication Function 925 via Internet 507. Secure Communication Function 925 receives Validation Response 504 and provides it to Signature Validation Procedure 905. Signature Validation Procedure 905 then transmits Validation Response 504 to Relying Customer Software Application 501 via Information API 604.

A detailed example of some embodiments of Relying Customer Service Engine 402 as depicted in FIG. 9 is provided as follows:

System API 603

System API 603 performs the following activities, as are known to workers in the art:
1. Start the operation of Relying Customer Service Engine 402.
2. Stop the operation of Relying Customer Service Engine 402.
3. Initialization, comprising:
    a. Read a file containing the Configuration Data, depicted as Config Data 705.
    b. Provide Config Data 705 to Initialization Function 910.
    c. Locate Logging Routines 710 and provide their location to Logging Function 915. These Log Routines will be invoked by other elements of Relying Customer Service Engine 402 as required and will be presented with appropriate information to be recorded to a file for business or technical use.

Information API 604

Information API 604 performs the following activities, as are known to workers in the art:
1. Validation Request Processing, comprising:
    a. Receive Validation Request 520 from Relying Customer Software Application 501.
    b. Provide Validation Request 520 to Signature Validation Procedure 905.
2. Validation Response Processing, comprising:
    a. Receive Validation Response 504 from Signature Validation Procedure 905.
    b. Transmit Validation Response 504 to Relying Customer Software Application 501.
    c. Invoke Logging Function 915 to record processing of Validation Request 520 and associated Validation Response 504.

Initialization Function 910

Initialization Function 910 performs the following activities, as are known to workers in the art:
1. Initialization, comprising:
    a. Receive Config Data 705 from System API 603.
    b. Store Config Data 705.
    c. Invoke initialization activity of Secure Communication Function 925.

Secure Communication Function 925

Secure Communication Function 925 performs the following activities, as are known to workers in the art (In some embodiments, Relying Customer Service Engine 402 will be able to communicate with Relying Participant Service Engine 403 using an existing secure communication channel, and alternative communication protocols may be used, as is known in the art. For example, if Relying Customer Service Engine 402 and Relying Participant Service Engine 403 are software modules running on the same computer system, then secure facilities provided by the computer system may be employed for communication between the software modules and some of the following activities would be simplified as is known in the art):
1. Initialization, comprising:
    a. Open a secure network connection with Relying Participant Service Engine 403.
    b. Identify Relying Customer Service Engine 402 to Relying Participant Service Engine 403 by presenting a Digital Certificate for Relying Customer Service Engine 402 as provided with Config Data 705.
    c. Receive an authentication response from Relying Participant Service Engine 403 containing the alleged Digital Certificate of Relying Participant Service Engine 403, and Authorization Key 920.
    d. Verify that the alleged Digital Certificate of Relying Participant Service Engine 403 matched a copy of the Digital Certificate of Relying Participant Service Engine 403 as provided with Config Data 705.
    e. Store Authorization Key 920. Authorization Key 920 will be presented to Relying Participant Service Engine 403 by Secure Communication Function 925 each time Validation Request 520 is communicated to Relying Participant Service Engine 403 to provide quick, low-overhead authorization without requiring an exchange of Digital Certificates.
    f. Invoke Logging Function 915 to record the establishment a secure communication channel to Relying Customer Service Engine 403.
2. Validation, comprising:
    a. Receive Validation Request 520 from Signature Validation Procedure 905.
    b. Format Validation Request 520 and Authorization Key 920 for secure transmission to Relying Participant Service Engine 403.
    c. Transmit Validation Request 520 and Authorization Key 920 to Relying Participant Service Engine 403. In some embodiments, if Signature Validation Procedure 905 performs consistency checking then Signed Data 503 is not included in Validation Request 520 when Validation Request 520 is transmitted to Relying Participant Service Engine 403.
    d. Receive Validation Response 504 from Relying Participant Service Engine 403.
    e. Decrypt Validation Response 504.
    f. Transmit decrypted Validation Response 504 to Signature Validation Procedure 905.
    g. Invoke Logging Function 915 to record transmission of Validation Request 520 and reception of Validation Response 504.
3. Handle Exceptions, comprising recover from communications errors as is known in the art; request new Authorization Key 920 from Relying Paticipant Service Engine 403 if communication with Relying Participant Service Engine 403 must be reestablished.

Logging Function 915

Logging Function 915 performs the following activities, as are known to workers in the art:
1. Write Logging Data 715 to Logging Routines 710 that were located as part of the Initialization activity of System API 603.

Signature Validation Procedure 905

Signature Validation Procedure 905 performs the following activities, as are known to workers in the art:
1. Validation Request Processing, comprising:
    a. Receive Validation Request 520 from Information API 604.
    b. Encode Electronic Signature 502 and, in some embodiments, Signed Data 503 in a Base64 format, as is known in the art, for eventual transmission via the Internet using a Secure HTTP network connection.
    c. In some embodiments, perform consistency checking as follows to determine if Electronic Signature 502 actually signed Signed Data 503 (known commercial toolkits such as the RSA BSAFE CRYPTO-J tools manufactured by RSA Security Corporate Headquarters: 20 Crosby Drive, Bedford, Mass. 01730, may be used to facilitate operations on encrypted materials):

(i) Open Electronic Signature 502 and extract the following information:
  (1) Digital Certificate used to create the Signature (Signing Certificate).
  (2) Message Digest for the Signed Data.
  (3) All of the Digital Certificates in the Certificate Chain.
(ii) Open the Signing Certificate and extract the following information:
  (1) The Distinguished Name of the Signing Certificate.
  (2) The Distinguished Name of the authority which issued the Signing Certificate.
  (3) The Common Name of the Signing Certificate.
  (4) The beginning and ending validity dates of the Signing Certificate.
  (5) The Serial Number of the Signing Certificate.
  (6) The Public Key of the Signing Certificate.
(iii) Determine if Electronic Signature 502 actually signed Signed Data 503:
  (1) Compute a Message Digest for Signed Data.
  (2) Decrypt the Message Digest in Electronic Signature 502, using the Public Key from the Digital Certificate of Electronic Signature 502.
  (3) Determine if the Message Digest for the Signed Data is identical to the Message Digest in Electronic Signature 502.
  (4) If the Message Digests are not identical then set the SIGNATURE DATA MATCH field to NO in Validation Response 504, transmit Validation Response 504 to Relying Customer Software Application 501 via Information API 604, and do not send Validation Request 520 to Relying Participant Service Engine 403.
  (5) If the Message Digests are identical then continue the transmission of Validation Request 520 to Relying Participant Service Engine 403, and set the SIGNATURE DATA MATCH field to YES in Validation Response 504.
d. Invoke Secure Communication Function 925 to transmit Validation Request 520 and Authorization Key 920 to Relying Participant Service Engine 403.

2. Validation Response Processing, comprising:
  a. Receive Validation Response 504 from Secure Communication Function 925.
  b. Decode Validation Response 504.
  c. Transmit Validation Response 504 to Relying Customer Software Application 501 via Information API 604.
  d. Invoke Logging Function 915 to record the processing of Validation Request 520 and Validation Response 504.

Figure 10:
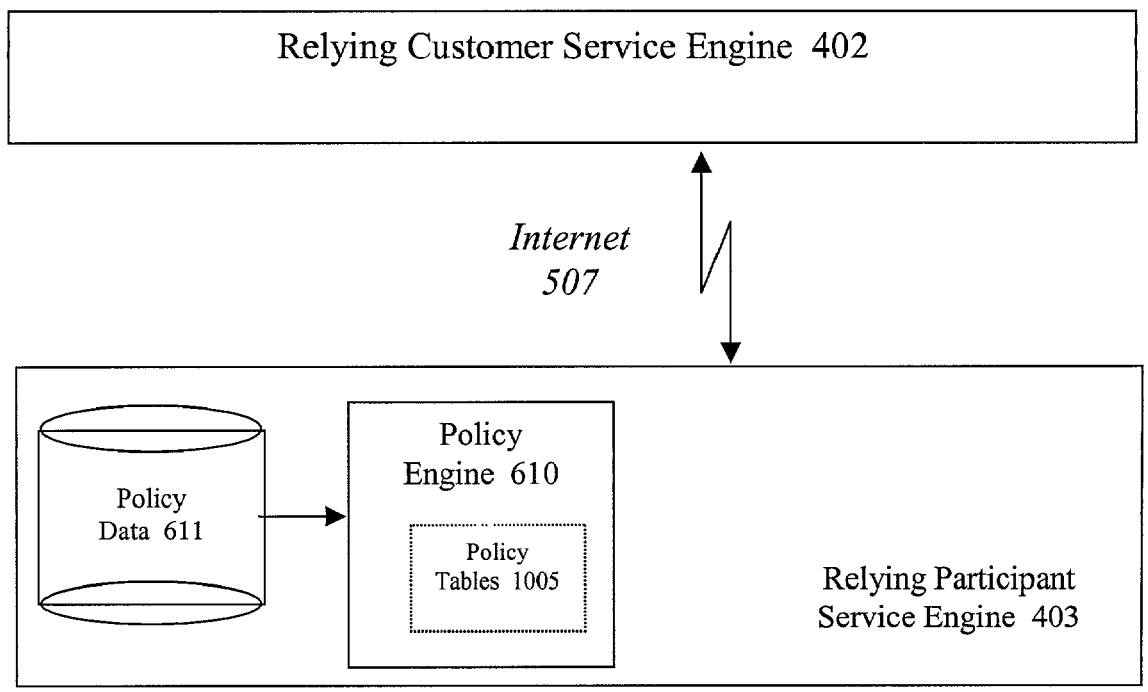
FIG. 10 is diagram depicting an embodiment of the Policy Engine of the Relying Participant Service Engine of the present invention.

FIG. 10 is a diagram depicting a Policy Engine of some embodiments of the Relying Participant Service Engine of the present invention. In some embodiments depicted in FIG. 10, Relying Participant Service Engine 403 comprises Policy Engine 610. In some embodiments of the present invention which are not depicted in FIG. 10, a Policy Engine is located in other portions of the invention where the Validation Response can be made responsive to the Policy Engine. Regardless of location, in some embodiments, the Policy Engine participates in the formulation of Validation Responses by making final determinations as to whether Electronic Signatures are valid. In some embodiments, the Policy Engine's determinations are based on policies provided by a Relying Participant. These policies may also require the Policy Engine to add other information to the Validation Response. For example, in some embodiments, the Policy Engine includes receipt numbers, and billing and administrative information, in Validation Responses.

In some embodiments, as depicted in FIG. 10, policy information is provided to Policy Engine 610 by the Relying Participant in the form of a policy data file, depicted as Policy Data 611. Policy Engine 610 converts Policy Data 611 to an internal format depicted as Policy Tables 1005. Policy Engine 610 then uses Policy Tables 1005 in processing Validation Responses. In some embodiments not depicted in FIG. 10, policy decision rules are built into the Policy Engine, and Policy Data and the corresponding Policy Tables are not used.

For example, in some embodiments of Policy Engine 610 depicted in FIG. 10, Policy Engine 610 performs the following activities, as are known to workers in the art:

1. Policy Definition, comprising:
  a. Translate the information contained in Policy Data 611 into Policy Tables 1005. In some embodiments, this information comprises:
    (i) A list of the names of Relying Customers whose Validation Requests will be processed.
    (ii) For each listed Relying Customer or, in some embodiments, for all listed Relying Customers, the policies to be applied. For example, and as is known in the art, such policies comprise:
      (1) Previously accessed and cached validation information to be used to validate an Electronic Signature if real-time validation information is not available.
      (2) Specified additional processing to be conducted in order to validate an Electronic Signature. For example, a special software module must run to validate the Electronic Signatures presented by a particular Relying Customer.
      (3) Instructions to provide a receipt number with each Validation Response.
  b. Check Policy Tables 1005 for internal consistency.
  c. Invoke a Logging Function (for example, Logging Function 1115 as depicted in FIG. 11) to record the Policy Definition processing.

2. Policy Decision, comprising:
  a. Examine a Validation Response.
  b. Locate the policies in Policy Tables 1005 that apply to the Validation Response, for example, the policies for the particular Relying Customer responsible for the Validation Request that resulted in the Validation Response.
  c. Evaluate the Validation Response with the applicable policies to determine if the Electronic Signature related to the Validation Response will be declared Valid or Invalid.
  d. As determined by the evaluation, provide a result of Valid or Invalid for the SIGNATURE VALIDITY portion of the Validation Response.
  e. Provide a receipt number for the SIGNATURE RECEIPT NUMBER portion of the Validation Response.
  f. Invoke a Logging Function (for example, Logging Function 1115 as depicted in FIG. 11) to record the processing of the Validation Response.

Figure 11:
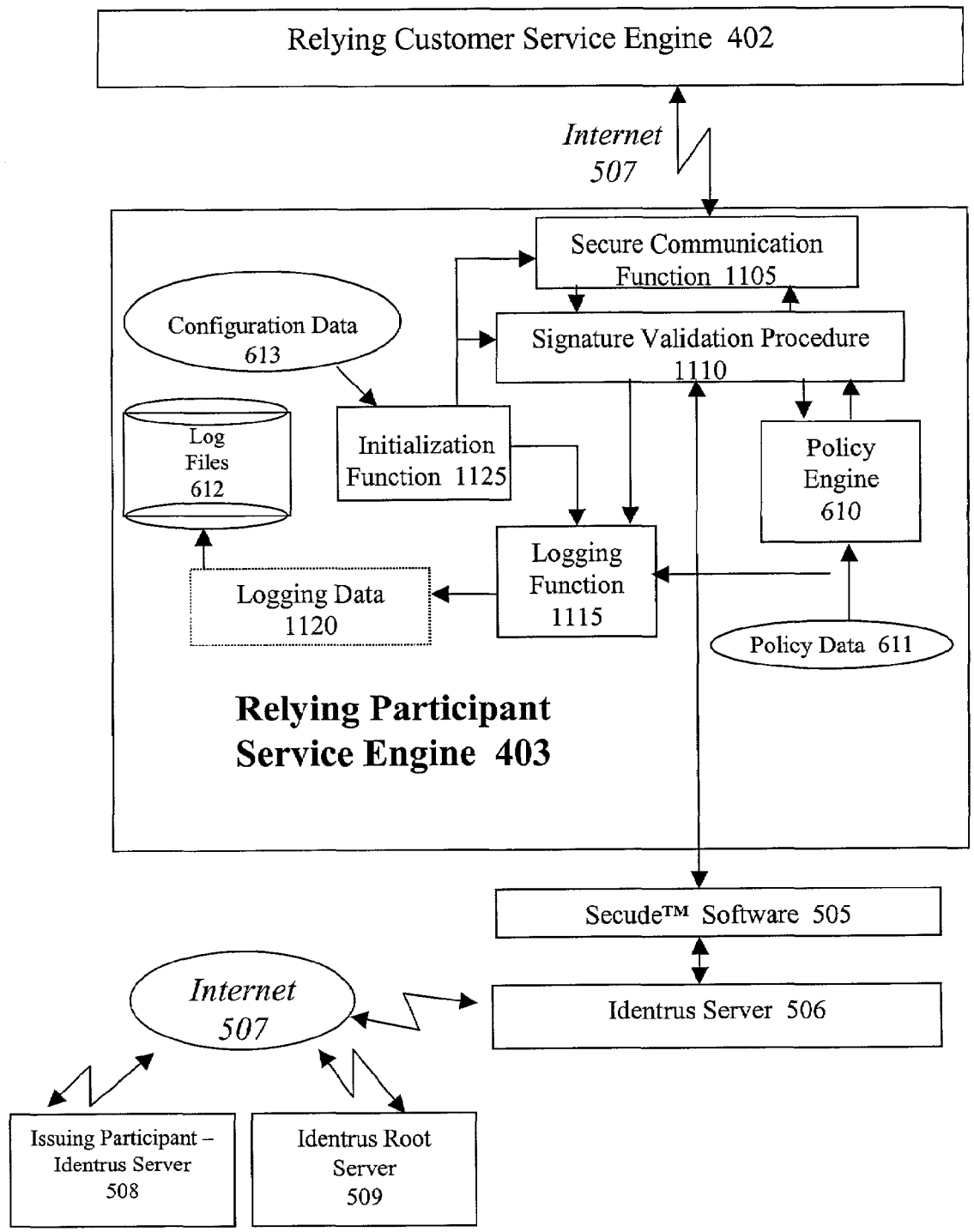
FIG. 11 is a more detailed diagram depicting an embodiment of the Relying Participant Service Engine.

FIG. 11 is a detailed diagram depicting some embodiments of the Relying Participant Service Engine of the present invention. As will be readily apparent to workers in the art, many other embodiments of the Relying Participant Service Engine may be employed and are within the scope of this invention. In some embodiments depicted in FIG. 11, Relying Participant Service Engine 403 is initialized for service by Initialization Function 1125. Initialization Function 1125 obtains Configuration Data for Relying Participant Service Engine 403 from a dataset depicted as Configuration Data 613, and makes the Configuration Data available to Secure Communication Function 1105, Signature Validation Procedure 1110, and Logging Function 1115. In some embodiments, Configuration Data 613 is built into Relying Participant Service Engine 403. In alternative embodiments, Configuration Data 613 is provided by an entity external to Relying Participant Service Engine 403 as is known in the art. For example, the Relying Participant may provide Configuration Data 613.

In some embodiments, as part of the initialization activity, Signature Validation Procedure 1110 establishes a secure communication channel with a Digital Certificate verification facility. In some embodiments, and for example, as depicted in FIG. 11, the Digital Certificate verification facility comprises Secude Software 505, Identrus Server 506, Issuing Participant-Identrus Server 508, and Identrus Root Server 509. As depicted in FIG. 11, Identrus Server 506, Issuing Participant-Identrus Server 508, and Identrus Root Server 509 communicate via a computer communication network such as the Internet, which is depicted as Internet 507.

In some embodiments, data relating to the activities performed by Relying Participant Service Engine 403, denoted by Logging Data 1120, including for example activities that occurred during initialization, are collected by Logging Function 1115 and transferred to Log Files 612 for storage.

Following initialization, in some embodiments, a Relying Customer Service Engine, depicted in FIG. 11 as Relying Customer Service Engine 402, establishes a secure communication channel with Secure Communication Function 1105. In some embodiments, the secure communication channel comprises a computer communication network such as the Internet, and is depicted as Internet 507 in FIG. 11. In some embodiments, Secure Communication Function 1105 generates an Authorization Key and sends the Authorization Key to Relying Customer Service Engine 402.

When a Validation Request is received by Secure Communication Function 1105 from Relying Customer Service Engine 402, the Validation Request is sent to Signature Validation Procedure 1110. In some embodiments, Signature Validation Procedure 1110 performs consistency checking on the Validation Request, and the Validation Request will include both an Electronic Signature and Signed Data that was allegedly signed by the Electronic Signature. If the consistency check determines that the Electronic Signature was used to properly sign the Signed Data, or if no consistency checking is performed, then Signature Validation Procedure 1110 formulates a Query based on the Digital Certificates contained in the Validation Request. If the consistency check determines that the Electronic Signature was not used to properly sign the Signed Data, then, in some embodiments, Signature Validation Procedure 1110 will send a Validation Response to Relying Customer Service Engine 402 via Secure Communication Function 1105 without further processing of the Validation Request, while, in other embodiments, Signature Validation Procedure 1110 will proceed to formulate a Query based on the Digital Certificates contained in the Validation Request.

After Signature Validation Procedure 1110 formulates a Query, Signature Validation Procedure 1110 transmits the Query to a Digital Certificate verification facility for processing. The Digital Certificate verification facility responds by transmitting a Query Response to Signature Validation Procedure 1110. In some embodiments, information in the Query Response related to the status of individual Digital Certificates is cached in Relying Participant Service Engine 403 for use when a Digital Certificate verification facility is temporarily unavailable.

When Signature Validation Procedure 1110 receives the Query Response, or, in some embodiments, when Signature Validation Procedure 1110 determines that the Digital Certificate verification facility is unavailable, Signature Validation Procedure 1110 formulates a Validation Response based on the Query Response and the Validation Request. In some embodiments, if a Digital Certificate verification facility was unavailable, the Validation Response is also formulated based on any cached information concern the status of the individual Digital Certificates that were contained in the Validation Request. In some embodiments, the Validation Response is also formulated based on determinations made by a Policy Engine, depicted in FIG. 11 by Policy Engine 610.

After Signature Validation Procedure 1110 formulates a Validation Response, Signature Validation Procedure 1110 transmits the Validation Response to Relying Customer Service Engine 402 via Secure Communication Function 1 105 and Internet 507.

A detailed example of some embodiments of Relying Participant Service Engine 403 as depicted in FIG. 11 is provided as follows:

Initialization Function 1125

Initialization Function 1125 performs the following actions, as are known to workers in the art:

1. Initialization, comprising:
    a. Access Configuration Data 613.
    b. Invoke Initialization activity of Signature Validation Procedure 1110.
    c. Invoke Logging Function 1115 to record initialization activities.

Logging Function 1115

Logging Function 1115 performs the following activities, as are known in the art:

1. Write Logging Data 1120 to Log Files 612.

Secure Communication Function 1105

Secure Communication Function 1105 performs the following activities, as are known in the art (In some embodiments, as is known in the art, Relying Participant Service Engine 403 may establish secure communications with a plurality of Relying Customer Service Engines, with Relying Participant Service Engine 403 performing as a server and each Relying Customer Service Engine performing as a client. This configuration is commonly referred to in the art as a client/server architecture. In some embodiments, Relying Customer Service Engine 402 will be able to communicate with Relying Participant Service Engine 403 using an existing secure communications channel, and alternative communications protocols may be used, as is known in the art. For example, if Relying Customer Service Engine 402 and Relying Participant Service Engine 403 are software modules running on the same computer system, then secure facilities provided by the computer system may be employed for communication between the software modules and some of the following activities would be simplified as is known in the art):

1. Initialization, comprising:
   a. Open a secure network connection with Relying Customer Service Engine 402.
   b. Receive a Digital Certificate from Relying Customer Service Engine 402.
   c. Verify that the Digital Certificate received from Relying Customer Service Engine 402 matches one of the Digital Certificates, provided in Configuration Data 613, of Relying Customer Service Engines that are authorized to receive service from Relying Participant Service Engine 403; abort the initialization if no match with an authorized Relying Customer Service Engine is found.
   d. Generate an Authorization Key for Relying Customer Service Engine 402.
   e. Transmit an authentication response to Relying Customer Service Engine 402 containing the Digital Certificate of Relying Participant Service Engine 403, provided in Configuration Data 613, and the Authorization Key.
   f. Invoke Logging Function 1115 to record establishment of secure communications channel with Relying Customer Service Engine 402.
2. Validation, comprising:
   a. Receive Validation Request and Authorization Key from Relying Customer Service Engine 402.
   b. Decrypt the Validation Request.
   c. Decrypt the Authorization Key.
   d. Verify that Authorization Key received from Relying Customer Service Engine 402 matches the Authorization Key that was transmitted to Relying Customer Service Engine 402 during execution of the Initialization Function of Secure Communication Function 1105; abort the Validation Function if the Authorization Keys do not match.
   e. Abstract the Electronic Signature and, in some embodiments, the Signed Data from the Validation Request.
   f. Decode the Electronic Signature and, in some embodiments, the Signed Data from Base64 format used for transmission.
   g. Transmit the Validation Request, comprising the decoded Electronic Signature and, in some embodiments, the decoded Signed Data, to Signature Validation Procedure 1110.
   h. Receive a Validation Response from Signature Validation Procedure 1110 in response to the Validation Request.
   i. Format the Validation Response for secure transmission to Relying Customer Service Engine 402.
   j. Transmit the Validation Response to Relying Customer Service Engine 402.
   k. Invoke Logging Function 1115 to record processing of Validation Request and Validation Response.
3. Handle Exceptions, comprising recover from communications errors as is known in the art; generate and transmit a new Authorization Key to Relying Customer Service Engine 402 if communication with Relying Customer Service Engine 402 must be reestablished.

Signature Validation Procedure 1110

Signature Validation Procedure 1110 performs the following activities, as are known in the art:

1. Initialization, comprising establish secure communication channel with Digital Certificate verification facility. As depicted in FIG. 11, the Digital Certificate verification facility comprises Secude Software 505, Identrus Server 506, Identrus Root Server 509, and Issuing Participant-Identrus Server 508, where communication between and among Identrus Server 506, Identrus Root Server 509, and Issuing Participant-Identrus Server 508 is conducted via Internet 507.
2. Validation Request Processing, comprising:
   a. Receive Validation Request from Secure Communication Function 1105.
   b. In some embodiments, perform consistency checking as follows to determine if the Electronic Signature actually signed the Signed Data (known commercial toolkits such as the RSA BSAFE CRYPTO-J tools, manufactured by RSA Security with corporate headquarters at 20 Crosby Drive, Bedford, Mass. 01730, may be used to facilitate operations on encrypted materials):
      (i) Open Electronic Signature and extract the following information:
         (1) Digital Certificate Used to create the Signature (Signing Certificate).
         (2) Message Digest for the Signed Data.
         (3) All of the Digital Certificates in the Certificate Chain.
      (ii) Open the Signing Certificate and extract the following information:
         (1) The Distinguished Name of the Signing Certificate.
         (2) The Distinguished Name of the authority which issued the Signing Certificate.
         (3) The Common Name of the Signing Certificate.
         (4) The beginning and ending validity dates of the Signing Certificate.
         (5) The Serial Number of the Signing Certificate.
         (6) The Public Key of the Signing Certificate.
      (iii) Determine if Electronic Signature actually signed Signed Data:
         (1) Compute a Message Digest for the Signed Data.
         (2) Decrypt the Message Digest in Electronic Signature, using the Public Key from the Digital Certificate of Electronic Signature.
         (3) Determine if the Message Digest for the Signed Data is identical to the Message Digest in Electronic Signature.
         (4) If the Message Digests are not identical then set the SIGNATURE DATA MATCH field to NO in Validation Response and, in some embodiments, transmit Validation Response to Relying Customer Service Engine 402 via Secure Communication Function 1105, and abort processing of the Validation Response.
         (5) If the Message Digests are identical then set the SIGNATURE DATA MATCH field to YES in the Validation Response.
   c. Verify that the Certificate Chain is properly chained, as is known in the art, such that, beginning with the Signing Certificate, each Digital Certificate was issued by the Digital Certificate above it in the chain, according to industry specifications, for example, provided by Identrus.
   d. Transmit a Query to a Digital Certificate verification facility, as is known in the art, to check the status of each Digital Certificate. As depicted in FIG. 11, the Digital Certificate verification facility is accessed by transmitting the Query to Secude Software 505.

e. Receive a Query Response from the Digital Certificate verification facility.
f. Store the status of each Digital Certificate as obtained from the Query Response in a Certificate Database Cache.
g. Set the SERVICE STATUS field in the Validation Response to SUCCESS.
h. If the Digitial Certificate verification facility cannot be accessed, then attempt to validate the Signer Digital Certificate as follows:
  (i) Attempt to find the Signer Digital Certificate in the Certificate Database Cache. As is known in the art, Certificate Database Cache information may be indexed by information such as the Certificate Serial Number and the Certificate Distinguished Name.
  (ii) If the Signer Digital Certificate is found in the Certificate Database Cache, set the SIGNING CERTIFICATE STATUS field in the Validation Response to the value for that field stored for the Signer Digital Certificate in the Certificate Database Cache, and set the SERVICE STATUS field in the Validation Response to CACHED.
  (iii) If the Signer Digital Certificate is not found in the Certificate Database Cache, set the SERVICE STATUS field in the Validation Response to SERVICED UNAVAILABLE.
i. In some embodiments, invoke the Policy Decision activity of Policy Engine 610.
j. Following processing by the Policy Decision activity of Policy Engine 610, if any, transmit the Validation Response to Secure Communications Function 1105 for transmission to Relying Customer Service Engine 402 via Internet 507.
k. Invoke Logging Function 1115 to record the processing of the Validation Request and the corresponding Validation Response.

Figure 12:
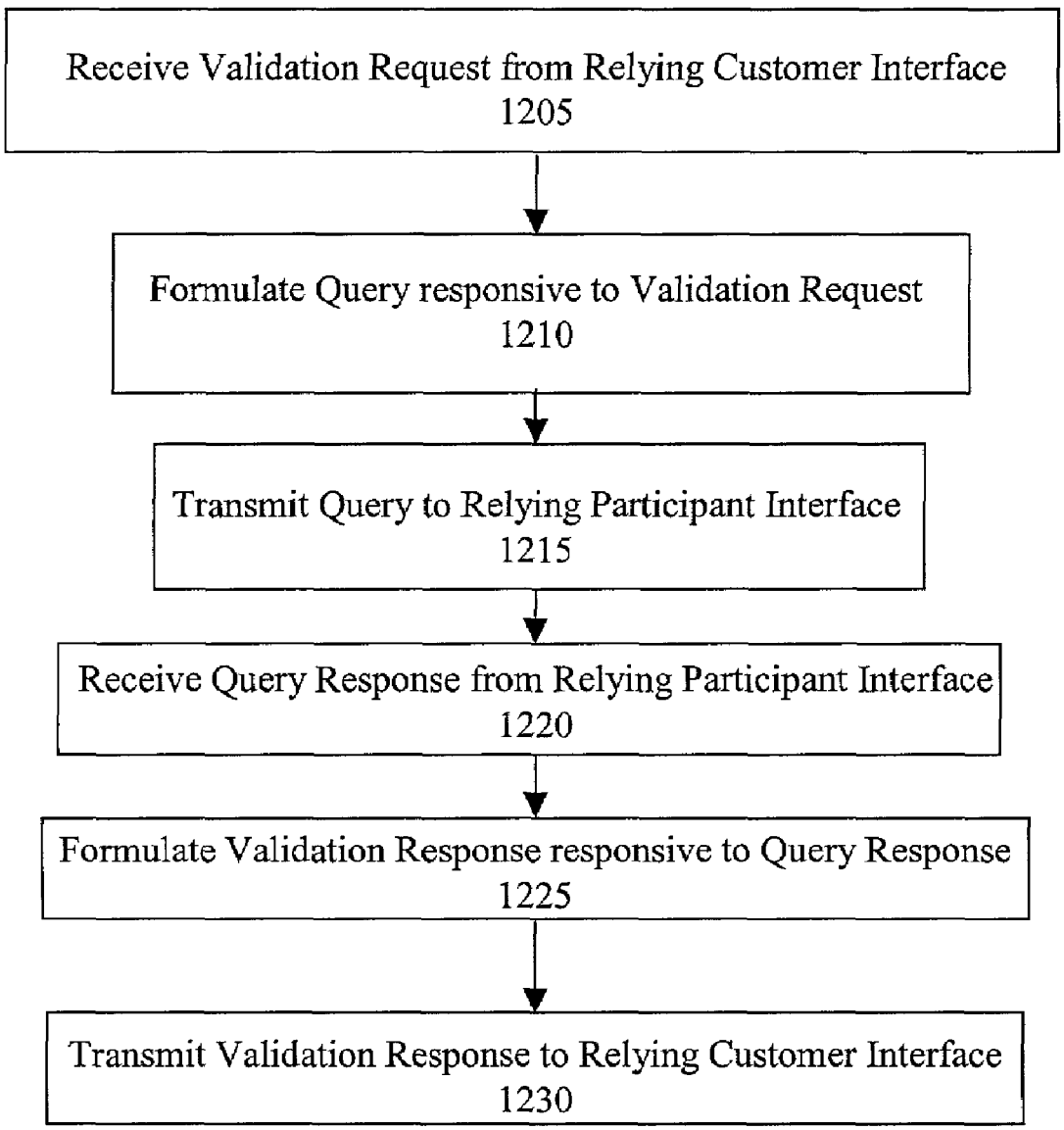
FIG. 12 is a flowchart depicting an embodiment of a method for performing cryptographic validity services of the present invention.

FIG. 12 is a flowchart depicting an embodiment of a method for performing cryptographic validity services of the present invention. This method comprises the activities of receiving a Validation Request from a Relying Customer Interface, formulating a Query responsive to the Validation Request, transmitting the Query to a Relying Participant Interface, receiving a Query Response from the Relying Participant Interface, formulating a Validation Response responsive to the Query Response, and transmitting the Validation Response to the Relying Customer Interface.

As depicted in FIG. 12, the activity of receiving a Validation Request from a Relying Customer Interface is accomplished by Receive Validation Request from Relying Customer Interface 1205. In some embodiments depicted in FIG. 9 and discussed in reference to Relying Customer Service Engine 402, Receive Validation Request from Relying Customer Interface 1205 is performed by Information API 604, Signature Validation Procedure 905, and Secure Communication Function 925. In other embodiments, Receive Validation Request from Relying Customer Interface 1205 is performed as is known in the art.

As depicted in FIG. 12, the activity of formulating a Query responsive to the Validation Request is accomplished by Formulate Query responsive to Validation Request 1210. In some embodiments depicted in FIG. 11 and discussed in reference to Relying Participant Service Engine 403, Formulate Query responsive to Validation Request 1210 is performed by Signature Validation Procedure 1110. In other embodiments, Formulate Query responsive to Validation Request 1210 is performed as is known in the art.

As depicted in FIG. 12, the activity of transmitting the Query to a Relying Participant Interface is accomplished by Transmit Query to Relying Participant Interface 1215. In some embodiments depicted in FIG. 11 and discussed in reference to Relying Participant Service Engine 403, Transmit Query to Relying Participant Interface 1215 is performed by Signature Validation Procedure 1110. In other embodiments, Transmit Query to Relying Participant Interface 1215 is performed as is known in the art.

As depicted in FIG. 12, the activity of receiving a Query Response from the Relying Participant Interface is accomplished by Receive Query Response from Relying Participant Interface 1220. In some embodiments depicted in FIG. 11 and discussed in reference to Relying Participant Service Engine 403, Receive Query Response from Relying Participant Interface 1220 is performed by Signature Validation Procedure 1110. In other embodiments, Receive Query Response from Relying Participant Interface 1220 is performed as is known in the art.

As depicted in FIG. 12, the activity of formulating a Validation Response responsive to the Query Response is accomplished by Formulate Validation Response responsive to Query Response 1225. In some embodiments depicted in FIG. 11 and discussed in reference to Relying Participant Service Engine 403, Formulate Validation Response responsive to Query Response 1225 is performed by Signature Validation Procedure 1110 in conjunction with, in some embodiments, Policy Engine 610. In other embodiments, Formulate Validation Response responsive to Query Response 1225 is performed as is known in the art.

As depicted in FIG. 12, the activity of transmitting the Validation Response to the Relying Customer Interface is accomplished by Transmit Validation Response to Relying Customer Interface 1230. In some embodiments depicted in FIG. 9 and discussed in reference to Relying Customer Service Engine 402, Transmit Validation Response to Relying Customer Interface 1230 is performed by Information API 604, Signature Validation Procedure 905, and Secure Communication Function 925. In other embodiments, Transmit Validation Response to Relying Customer Interface 1230 is performed as is known in the art.

Figure 13:
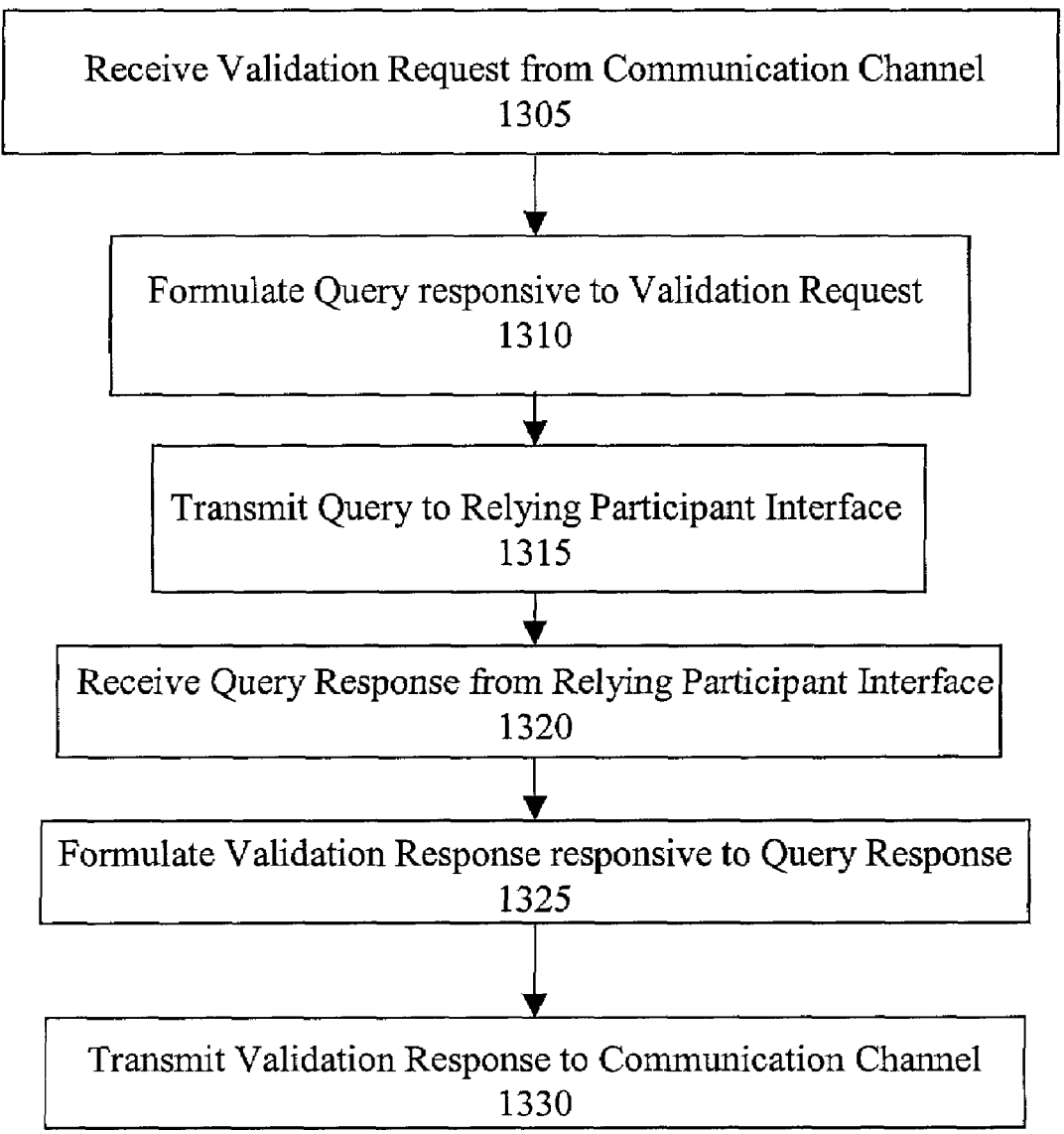
FIG. 13 is a flowchart depicting an additional embodiment of a method for performing cryptographic validity services of the present invention.

FIG. 13 is a flowchart depicting an embodiment of a method for performing cryptographic validity services of the present invention. This method comprises the activities of receiving a Validation Request from a Communication Channel, formulating a Query responsive to the Validation Request, transmitting the Query to a Relying Participant Interface, receiving a Query Response from the Relying Participant Interface, formulating a Validation Response responsive to the Query Response, and transmitting the Validation Response to the Communication Channel.

As depicted in FIG. 13, the activity of receiving a Validation Request from a Communication Channel is accomplished by Receive Validation Request from Communication Channel 1305. In some embodiments depicted in FIG. 11 and discussed in reference to Relying Participant Service Engine 403, Receive Validation Request from Communication Channel 1305 is performed by Secure Communication Function 1105. In other embodiments, Receive Validation Request from Communication Channel 1305 is performed as is known in the art.

As depicted in FIG. 13, the activity of formulating a Query responsive to the Validation Request is accomplished by Formulate Query responsive to Validation Request 1310. In some embodiments depicted in FIG. 11 and discussed in reference to Relying Participant Service Engine 403, Formulate Query responsive to Validation Request 1310 is performed by Signature Validation Procedure 1110. In other embodiments, Formulate Query responsive to Validation Request 1310 is performed as is known in the art.

As depicted in FIG. 13, the activity of transmitting the Query to a Relying Participant Interface is accomplished by Transmit Query to Relying Participant Interface 1315. In some embodiments depicted in FIG. 11 and discussed in reference to Relying Participant Service Engine 403, Transmit Query to Relying Participant Interface 1315 is performed by Signature Validation Procedure 1110. In other embodiments, Transmit Query to Relying Participant Interface 1315 is performed as is known in the art.

As depicted in FIG. 13, the activity of receiving a Query Response from the Relying Participant Interface is accomplished by Receive Query Response from Relying Participant Interface 1320. In some embodiments depicted in FIG. 11 and discussed in reference to Relying Participant Service Engine 403, Receive Query Response from Relying Participant Interface 1320 is performed by Signature Validation Procedure 1110. In other embodiments, Receive Query Response from Relying Participant Interface 1320 is performed as is known in the art.

As depicted in FIG. 13, the activity of formulating a Validation Response responsive to the Query Response is accomplished by Formulate Validation Response responsive to Query Response 1325. In some embodiments depicted in FIG. 11 and discussed in reference to Relying Participant Service Engine 403, Formulate Validation Response responsive to Query Response 1325 is performed by Signature Validation Procedure 1110 in conjunction with, in some embodiments, Policy Engine 610. In other embodiments, Formulate Validation Response responsive to Query Response 1325 is performed as is known in the art.

As depicted in FIG. 13, the activity of transmitting the Validation Response to the Communication Channel is accomplished by Transmit Validation Response to Communication Channel 1330. In some embodiments depicted in FIG. 11 and discussed in reference to Relying Participant Service Engine 403, Transmit Validation Response to Communication Channel 1330 is performed by Secure Communication Function 1105. In other embodiments, Transmit Validation Response to Communication Channel 1330 is performed as is known in the art.

In some embodiments, the activity of receiving a Validation Request from a Relying Customer Interface is accomplished by a Validation Request Receiver element. In some embodiments depicted in FIG. 9 and discussed in reference to Relying Customer Service Engine 402, the Validation Request Receiver element for receiving a Validation Request from a Relying Customer Interface comprises Information API 604, Signature Validation Procedure 905, and Secure Communication Function 925. In other embodiments, the Validation Request Receiver element for receiving a Validation Request from a Relying Customer Interface is implemented as is known in the art.

In some embodiments, the Validation Request Receiver element for receiving a Validation Request from a Relying Customer Interface comprises a Consistency Checker element. In some embodiments depicted in FIG. 9 and discussed in reference to Relying Customer Service Engine 402, the Consistency Checker element comprises Signature Validation Procedure 905. In other embodiments, the Consistency Checker element is implemented as is known in the art.

In some embodiments, the activity of receiving a Validation Request from a Communication Channel is accomplished by a Validation Request Receiver element. In some embodiments depicted in FIG. 11 and discussed in reference to Relying Participant Service Engine 403, the Validation Request Receiver element for receiving a Validation Request from a Communication Channel comprises Secure Communication Function 1105. In other embodiments, the Validation Request Receiver element for receiving a Validation Request from a Communication Channel is implemented as is known in the art.

In some embodiments, the activity of formulating a Query responsive to the Validation Request is accomplished by a Query Formulator element. In some embodiments depicted in FIG. 11 and discussed in reference to Relying Participant Service Engine 403, the Query Formulator element comprises Signature Validation Procedure 1110. In other embodiments, the Query Formulator element is implemented as is known in the art.

In some embodiments, the Query Formulator comprises a Consistency Checker element. In some embodiments depicted in FIG. 11 and discussed in reference to Relying Participant Service Engine 403, the Consistency Checker element comprises Signature Validation Procedure 1110. In other embodiments, the Consistency Checker element is implemented as is known in the art.

In some embodiments, the activity of transmitting the Query to a Relying Participant Interface is accomplished by a Query Transmitter element. In some embodiments depicted in FIG. 11 and discussed in reference to Relying Participant Service Engine 403, the Query Transmitter element comprises Signature Validation Procedure 1110. In other embodiments, the Query Transmitter element is implemented as is known in the art.

In some embodiments, the activity of receiving a Query Response from the Relying Participant Interface is accomplished by a Query Response Receiver element. In some embodiments depicted in FIG. 11 and discussed in reference to Relying Participant Service Engine 403, the Query Response Receiver element comprises Signature Validation Procedure 1110. In other embodiments, the Query Response Receiver element is implemented as is known in the art.

In some embodiments, the activity of formulating a Validation Response responsive to the Query Response is accomplished by a Validation Response Formulator. In some embodiments depicted in FIG. 11 and discussed in reference to Relying Participant Service Engine 403, the Validation Response Formulator element comprises Signature Validation Procedure 1110 in conjunction with, in some embodiments, Policy Engine 610. In other embodiments, the Validation Response Formulator element is implemented as is known in the art.

In some embodiments, the activity of transmitting the Validation Response to the Relying Customer Interface is accomplished by a Validation Response Transmitter element. In some embodiments depicted in FIG. 9 and discussed in reference to Relying Customer Service Engine 402, the Validation Response Transmitter element for transmitting the Validation Response to the Relying Customer Interface comprises Information API 604, Signature Validation Procedure 905, and Secure Communication Function 925. In other embodiments, the Validation Response Transmitter element for transmitting the Validation Response to the Relying Customer Interface is implemented as is known in the art.

In some embodiments, the activity of transmitting the Validation Response to the Communication Channel is accomplished by a Validation Response Transmitter. In some embodiments depicted in FIG. 11 and discussed in reference to Relying Participant Service Engine 403, the Validation Response Transmitter element for transmitting the Validation Response to the Communication Channel comprises Secure Communication Function 1105. In other embodiments, the Validation Response Transmitter element for transmitting the Validation Response to the Communication Channel is implemented as is known in the art.

As described previously in this specification, the present invention may be implemented in hardware, in software running on general or special purpose computers, or as a combination of hardware and software. Software implementations may employ a wide variety of programming languages, such as Java, COBOL, C, C++, and other procedural languages as is known in the art. For example, an embodiment of Application Programming Interfaces of the present invention for the Java programming language is provided as follows:

The Java API Specification

1. Information API

In this example and some embodiments of the present invention, the Information API defines the flow of information between a Relying Customer Software Application and systems, apparatuses or methods of the present invention. The Information API supports the PKCS7 signature validation functionality, as is known in the art. The PKCS7 signature validation functionality indicates to the Relying Customer Service Application that Identrus PKCS7 did or did not sign particular data, and that the PKCS7 contains or does not contain a valid Identrus signature, certificate status, and certificate chain status. The Information API also provides the Relying Customer Service Application with information about the contents of the PKCS7, as well as additional optional information.

This service is provided by a single Java Class with the following specification:

public class IdentrusValidation extends Object

Constructor:

public IdentrusValidation( ) throws IdentrusValidationException

The constructor requires no arguments.

Method to Check PKCS7 Status:

public java.util.Properties checkStatus(String Base64PKCS7, byte[ ] signedData) throws IdentrusValidationException This method is used to check the status of an Identrus PKCS7 signature and its associated data.

The input arguments are:
Base64PKCS7—The PKCS7 signature in the same BASE64 String format output by the Identrus ISIL or the Identrus Plugin.
SignedData—A byte array containing the data alleged to have been signed by the PKCS7.

The output is a single util.Properties object which contains the following KEY-VALUE pairs:
IDENTRUS_VALIDATION_VERSION Version Number of this IdentrusValidation Class.
SIGNATURE_VALIDITY PKCS7 Signature IS/IS NOT valid as determined by this Relying Participant.
SIGNATURE_DATA_STATUS PKCS7 Signature DOES/NOT match this data.
SIGNING_CERT_STATUS Status of the Signing Cert.
CA_1_CERT_STATUS Status of the First CA Cert in this chain.
CA_n_CERT_STATUS Status of the Nth CA Cert in this chain.
SIGNING_CERT_DN Distinguished Name of the Signing Cert.
SIGNING_CERT_SERIAL_NO Serial Number of the Signing Cert
SIGNING_CERT_ISSUER DN of Issuer.
SIGNING_CERT_NOT_VALID_BEFORE First Validity Date
SIGNING_CERT_NOT_VALID_AFTER Last Validity Date Values returned for SIGNATURE VALIDITY
SIGNATURE_IS_VALID Returned if Signature is Valid. Otherwise "NO";

Values returned for CERTIFICATE STATUS
CERTIFICATE_GOOD Certificate is good.
CERTIFICATE_UNRECOGNIZED Certificate contains unrecognized content or format.
CERTIFICATE_NO_RESPONSE Information not currently available.
CERTIFICATE_REVOKED Certificate has been revoked.
CERTIFICATE_UNKNOWN Certificate is unknown to the responder.

Values returned for SIGNATURE-DATA STATUS
SIGNATURE_DATA_MATCH Signature matches the data. Otherwise "NO";

Class IdentrusValidationException

Object

|

Exception

|

+- - - - IdentrusValidationException public class IdentrusValidationException extends Exception Constructor:

public IdentrusValidationException(String exceptionDiagnosticinformation) { }

2. Policy API

In this example and some embodiments of the present invention, the Policy API defines the flow of information between a Policy Engine and the Relying Participant Service Engine portion of the present invention. The general outline is a class:
    Interface IdentrusValidationPolicy {
      Public void policy(Properties pstatus, byte[ ] pkcs7, byte[ ] SignedData);
    }

The method 'policy' is provided a Java Properties object containing all of the known information about the Digital Signature, Digital Certificates and Signed Data. The value for SIGNATURE_IS_VALID must be returned in the Properties object. Any additional values placed into the Properties object will also be returned to the Relying Customer Software Application that invoked the Information API.

3. System API

In this example and some embodiments of the present invention, the System API defines the flow of configuration and control information between a Relying Customer Software Application and the present invention.

Class IdentrusValidation

Object

+- - - - IdentrusValidation public class IdentrusValidation extends Object

Constructor:

public IdentrusValidation(Properties configPropertiesFile) throws IdentrusValidationException The constructor takes a single argument, the Configuration Properties File that, in some embodiments, is supplied by the Relying Participant. This Java Properties file contains configuration specific values such as the Domain Name Server ("DNS") location of the Relying Participant's validation service, etc.

public class IdentrusValidation extends Object

Constructor:

public IdentrusValidation(Properties configPropertiesFile) throws IdentrusValidationException The constructor takes a single argument, the Configuration Properties File that, in some embodiments, is supplied by the Relying Participant. This Java Properties file contains configuration specific values such as the DNS location of the Relying Participant's validation service, etc.

System Initialization:

public void init(String ConfigurationPropertiesFilename) throws IdentrusValidationException The init( ) method takes a single argument, the Configuration Properties File that, in some embodiments, is supplied by the Relying Participant. This Java Properties file contains configuration specific values such as the DNS location of the Relying Participant's validation service, etc.

Register Policy Engine:

public String registerPolicyEngine(IdentrusValidationPolicy policyObject)) throws IdentrusValidationException The registerPolicyEngine( ) method takes a single argument, the IdentrusValidationPolicy class that, in some embodiments, is supplied by the Relying Participant. This object conforms to the IdentrusValidationPolicy Interface defined in the Policy API's. After this invocation, the specified object will be invoked for each invocation of the Application API checkStatus( ).

Register Log Record Handler:

public String registerLogHandler(IdentrusLogRecordHandler LogRecordObject)) throws IdentrusValidationException The registerLogHandler( ) method takes a single argument, the IdentrusLogRecordHandler class that, in some embodiments, is supplied by either the Relying Participant or the Relying Customer, or both. This object conforms to the IdentrusLogRecordHandler Interface defined in the System API's. After this invocation, the specified object will be invoked each time an IRCF Logging Record is available so it may be recorded or transmitted by the LogRecordObject.

Any number of objects may be IdentrusLogRecordHandler registered. Each registered IdentrusLogRecordHandler will be invoked for each log record.

Interface IdentrusLogRecordHandler {
    Public void logRecord(String LogRecord);
}

It should be understood that the preceding is merely a detailed description of some examples and embodiments of this invention and that numerous changes to the disclosed embodiments can be made in accordance with the disclosure herein without departing from the spirit or scope of the invention. The preceding description, therefore, is not meant to limit the scope of the invention.

We claim:

1. A system for performing cryptographic validity services comprising:
   a Distributed Storage Array comprising at least one Storage Device; and
   a Distributed Processor Array couple to the Distributed Storage Array, the Distributed Processor Array comprising at least one Processor, and the Distributed Storage Array storing a Program for controlling the Distributed Processor Array, wherein the Program comprises a Relying Customer Service Engine in communication with a Relying Participant Service Engine; and
   the Distributed Processor Array is operative with the Program to receive a Validation Request from a Relying Customer Interface;
      formulate a Query responsive to the Validation Request;
      transmit the Query to a Relying Participant Interface;
      receive a Query Response from the Relying Participant Interface;
      formulate a Validation Response responsive to the Query Response; and
      transmit the Validation Response to the Relying Customer Interface; and
   the Distributed Processor Array is operative with the Relying Customer Service Engine to
      receive the Validation Request from the Relying Customer Interface, and
      transmit the Validation Response to the Relying Customer Interface; and
   the Distributed Processor Array is operative with the Relying Participant Service Engine to
      formulate the Query responsive to the Validation Request,
      transmit the Query to the Relying Participant Interface,
      receive the Query Response from the Relying Participant Interface, and
      formulate the Validation Response responsive to the Query Response.

2. The system for performing cryptographic validity services of claim 1, wherein the Distributed Processor Array is operative with the Relying Customer Service Engine to perform consistency checking on the Validation Request.

3. The system for performing cryptographic validity services of claim 1, wherein the Distributed Processor Array is further operative with the Relying Customer Service Engine and the Distributed Process Array is further operative with the Relying Participant Service Engine to establish a Communication Channel between the Relying Customer Service Engine and the Relying Participant Service Engine.

4. The system for performing cryptographic validity services of claim 3, wherein the Communication Channel comprises the Internet.

5. The system for performing cryptographic validity services of claim 3, wherein the Distributed Processor Array is further operative with the Relying Customer Service Engine to transmit the Validation Request to the Communication Channel and receive the Validation Response from the Communication Channel; and the Distributed Processor Array is further operative with the Relying Participant Service Engine to receive the Validation Request from the Communication Channel and transmit the Validation Response to the Communication Channel.

6. The system for performing cryptographic validity services of claim 5, wherein the Distributed Processor Array is further operative with the Relying Customer Service Engine to expose a System Application Programming Interface.

7. The system for performing cryptographic validity services of claim 6, wherein configuration and control information for the Program is received through the System Application Programming Interface.

8. The system for performing cryptographic validity services of claim 5, wherein the Distributed Processor Array is further operative with the Relying Customer Service Engine to expose an Information Application Programming Interface.

9. The system for performing cryptographic validity services of claim 8, wherein the Relying Customer Interface comprises the Information Application Programming Interface.

10. The system for performing cryptographic validity services of claim 9, wherein the Validation Request comprises and Electronic Signature, the Electronic Signature comprises a Digital Certificate and a Message Digest, wherein the Message Digest is responsive to Signed Data.

11. The system for performing cryptographic validity services of claim 1, wherein the Relying Participant Service Engine comprises a Policy Engine and the Validation Response is further responsive to the Policy Engine.

12. The system for performing cryptographic validity services of claim 1, wherein the Distributed Processor Array is operative with the Relying Participant Service Engine to perform consistency checking on the Validation Request.

13. A method for performing cryptographic validity services comprising:
   receiving a Validation Request from a Relying Customer Interface;
   formulating a Query responsive to the Validation Request;
   transmitting the Query to a Relying Participant Interface;
   receiving a Query Response from the Relying Participant Interface;
   formulating a Validation Response responsive to the Query Response;
   transmitting the Validation Response to the Relying Customer Interface; and
   wherein receiving the Validation Request from the Relying Customer Interface and transmitting the Validation Request from the Relying Customer Interface are performed by a Relying Customer Service Engine; wherein formulating the Query responsive to the Validation Request, transmitting the Query to the Relying Participant Interface, receiving the Query Response from the Relying Participant Interface, and formulating the Validation Response responsive to the Query Response are performed by a Relying Participant Service Engine; and wherein the Relying Customer Service Engine is in communication with the Relying Participant Service Engine.

14. The method for performing cryptographic validity services of claim 13, further comprising performing consistency checking on the Validation Request and wherein performing consistency checking on the Validation Request is performed by the Relying Customer Service Engine.

15. The method of claim 14 for performing consistency checking on the Validation Request is performed by the Relying Customer Service Engine.

16. The method for performing cryptographic validity services of claim 15, wherein the Communication Channel comprises the Internet.

17. The method for performing cryptographic validity services of claim 15, further comprising transmitting the Validation Request to the Communication Channel, receiving the Validation Response from the Communication Channel, receiving the Validation Request from the Communication Channel, and transmitting the Validation Response to the Communication Channel; wherein transmitting the Validation request to the Communication Channel and receiving the Validation Response from the Communication Channel are performed by the Relying Customer Service Engine; and wherein receiving the Validation Request from the Communication Channel and transmitting the Validation Response to the Communication Channel are performed by the Relying Participant Service Engine.

18. The method for performing cryptographic validity services of claim 17, further comprising exposing, by the Relying Customer Service Engine, a System Application Programming Interface.

19. The method for performing cryptographic validity services of claim 18, further comprising receiving, by the Relying Customer Service Engine, configuration and control information through the System Application Programming Interface.

20. The method for performing cryptographic validity services of claim 17, further comprising exposing, by the Relying Customer Service Engine, an Information Application Programming Interface.

21. The method for performing cryptographic validity services of claim 20, wherein the Relying Customer Interface comprises the Information Application Programming Interface.

22. The method for performing cryptographic validity services of claim 21, wherein the Validation Request comprises an Electronic Signature, the Electronic Signature comprising a Digital Certificate and a Message Digest, wherein the Message Digest is responsive to Signed Data.

23. The method for performing cryptographic validity services of claim 13, wherein the Relying Participant Service Engine comprises a Policy Engine and the Validation Response is further responsive to the Policy Engine.

24. The method for performing cryptographic validity services of claim 13, further comprising performing, by the Relying Participant Service Engine, consistency checking on the Validation Request.

25. The method for performing cryptographic validity services comprising:
   receiving a Validation Request from a Communication Channel;
   formulating a Query responsive to the Validation Request;
   transmitting the Query to a Relying Participant Interface;
   receiving a Query Response from the Relying Participant Interface;
   formulating a Validation Response responsive to the Query Response;
   transmitting the Validation Response to the Communication Channel; and
   wherein receiving the Validation Request from the Communication Channel, formulating the Query responsive to the Validation Request, transmitting the Query to the Relying Participant Interface, receiving the Query Response from the Relying Participant Interface, formulating the Validation Response responsive to the Query Response, and transmitting the Validation Response to the Communication Channel are performed by a Relying Participant Service Engine.

26. The method for performing cryptographic validity services of claim 25, wherein the Relying Participant Service Engine comprises a Policy Engine and the Validation Response is further responsive to the Policy Engine.

27. The method for performing cryptographic validity services of claim 25, further comprising performing, by the Relying Participant Service Engine, consistency checking on the Validation Request.

28. An apparatus for performing cryptographic validity services comprising:
- a Validation Request Receiver, wherein a Validation Request is received from a Relying Customer Interface;
- a Query Formulator, in communication with the Validation Request Receiver, wherein a Query is formulated responsive to the Validation request;
- a Query Transmitter, in communication with the Query Formulator, wherein the Query is transmitted to a Relying Participant Interface;
- a Query Response Receiver, wherein the Query Response is received from the Relying Participant Interface;
- a Validation Response Formulator, in communication with the Query Response Receiver, wherein a Validation Response is formulated responsive to the Query Response;
- a Validation Response Transmitter, in communication with the Validation Response Formulator, wherein the Validation Response is transmitted to the Relying Customer Interface; and
- a Relying Customer Service Engine in communication with a Relying Participant Service Engine, wherein the Relying Customer Service Engine comprises the Validation Request Receiver and the Validation Response Transmitter, and wherein the Relying Participant Service Engine comprises the Query Formulator, the Query Transmitter, the Query Response Receiver, and the Validation Response Formulator.

29. The apparatus for performing cryptographic validity services of claim 28, wherein the Validation Request Receiver comprises a Consistency Checker and wherein the Consistency Checker performs consistency checking on the Validation Request.

30. The apparatus for performing cryptographic validity services of claim 28, further comprising a Communication Channel in communication with the Relying Customer Service Engine and in communication with the Relying Participant Service Engine.

31. The apparatus for performing cryptographic validity services of claim 30, wherein the Communication Channel comprises the Internet.

32. The apparatus for performing cryptographic validity services of claim 30, wherein the Validation Request Receiver transmits the Validation Request to the Communication Channel, the Query Formulator receives the Validation Request from the Communication Channel, the Validation Response Formulator transmits the Validation Response to the Communication Channel, and the Validation Response Transmitter receives the Validation Response from the Communication Channel.

33. The apparatus for performing cryptographic validity services of claim 32, wherein the Relying Customer Service Engine exposes a System Application Programming Interface.

34. The apparatus for performing cryptographic validity services of claim 33, wherein configuration and control information is received through the System Application Programming Interface.

35. The apparatus for performing cryptographic validity services of claim 32, wherein the Relying Customer Service Engine exposes an Information Application Programming Interface.

36. The apparatus for performing cryptographic validity services of claim 35, wherein the Relying Customer Interface comprises the Information Application Programming Interface.

37. The apparatus for performing cryptographic validity services of claim 36, wherein the Validation Request comprises an Electronic Signature, the Electronic Signature comprising a Digital Certificate and a Message Digest, wherein the Message Digest is responsive to Signed Data.

38. The apparatus for performing cryptographic validity services of claim 28, wherein the Validation Response Formulator comprises a Policy Engine and the Validation Response is further responsive to the Policy Engine.

39. The apparatus for performing cryptographic validity services of claim 28, wherein the Query Formulator comprises a Consistency Checker and wherein the Consistency Checker performs consistency checking on the Validation Request.

40. An apparatus for performing cryptographic validity services comprising:
- means for receiving a Validation Request from a Relying Customer Interface;
- means, in communication with the means for receiving a Validation Request from a Relying Customer Interface, for formulating, responsive to the Validation Request, a Query;
- means, in communication with the means for formulating a Query, for transmitting the Query to a Relying Participant Interface;
- means for receiving a Query Response from the Relying Participant Interface;
- means, in communication with the means for receiving a Query Response from the Relying Participant Interface, for formulating, responsive to the Query Response, a Validation Response;
- means, in communication with the means for formulating a Validation Response, for transmitting the Validation Response to the Relying Customer Interface; and
- a Relying Customer Service Engine in communication with a Relying Participant Service Engine, wherein the Relying Customer Service Engine comprises the means for receiving the Validation Request from the Relying Customer Interface and the means for transmitting the Validation Response to the Relying Customer Interface, and wherein the Relying Participant Service Engine comprises the means for formulating a Query, the means for transmitting the Query to the Relying Participant Interface, the means for receiving the Query Response from the Relying Participant Interface, and the means for formulating the Validation Response.

41. The apparatus for performing cryptographic validity services of claim 40, wherein the means for receiving the Validation Request from the Relying Customer Interface comprises means for performing consistency checking on the Validation Request.

42. The apparatus for performing cryptographic validity services of claim 40, further comprising a Communication Channel in communication with the Relying Customer Service Engine and in communication with the Relying Participant Service Engine.

43. The apparatus for performing cryptographic validity services of claim 42, wherein the Communication Channel comprises the Internet.

44. The apparatus for performing cryptographic validity services of claim 42, wherein the means for receiving the Validation Request from the Relying Customer Interface comprises means for transmitting the Validation Request to the Communication Channel, the means for formulating the Query comprises means for receiving the Validation Request from the Communication Channel, the means for formulating the Validation Response comprises means for transmitting the Validation Response to the Communication Channel, and the means for transmitting the Validation Response to the Relying Customer Interface comprises means for receiving the Validation Response from the Communication Channel.

45. The apparatus for performing cryptographic validity services of claim 44, wherein the Relying Customer Service Engine further comprises means for exposing a System Application Programming Interface.

46. The apparatus for performing cryptographic validity services of claim 45, wherein configuration and control information is received through the System Application Programming Interface.

47. The apparatus for performing cryptographic validity services of claim 44, wherein the Relying Customer Service Engine has means for exposing an Information Application Programming Interface.

48. The apparatus for performing cryptographic validity services of claim 47, wherein the Relying Customer Interface comprises the Information Application Programming Interface.

49. The apparatus for performing cryptographic validity services of claim 48, wherein the Validation Request comprises an Electronic Signature, the Electronic Signature comprising a Digital Certificate and a Message Digest, wherein the Message Digest is responsive to Signed Data.

50. The apparatus for performing cryptographic validity services of claim 40, wherein the means for formulating the Validation Response comprises a Policy Engine and the Validation Response is further responsive to the Policy Engine.

51. The apparatus for performing cryptographic validity services of claim 40, wherein the means for formulating a Query comprises means for performing consistency checking on the Validation Response.

52. An apparatus for performing cryptographic validity services comprising;

means for receiving a Validation Request from a Communication Channel;

means, in communication with the means for receiving a Validation Request from a Communication Channel, for formulating, responsive to the Validation Request, a Query;

means, in communication with the means for formulating a Query, for transmitting the Query to a Relying Participant Interface;

means for receiving a Query Response from the Relying Participant Interface; means, in communication with the means for receiving a Query Response from the Relying Participant Interface, for formulating, responsive to the Query Response, a Validation Response;

response, for Transmitting the Validation Response to the Communication Channel; and a Relying Participant Service Engine, wherein the Relying Participant Service Engine comprises the means for receiving the Validation Request from the Communication Channel, the means for formulating the Query, the means for transmitting the Query to the Relying Participant Interface, the means for receiving the Query Response from the Relying Participant Interface, the means for formulating the Validation Response, and the means for transmitting the Validation Response to the Communication Channel.

53. The apparatus for performing cryptographic validity services of claim 52, wherein the means for formulating the Validation Response comprises a Policy Engine and the Validation Response is further responsive to the Policy Engine.

54. The apparatus for performing cryptographic validity services of claim 53, wherein the means for formulating the Query comprises means for performing consistency checking on the Validation Request.

* * * * *